US011443698B2

(12) United States Patent
In

(10) Patent No.: US 11,443,698 B2
(45) Date of Patent: Sep. 13, 2022

(54) DATA DRIVER AND DISPLAY DEVICE INCLUDING A DATA DRIVER

(71) Applicant: Samsung Display Co., Ltd., Yongin-Si (KR)

(72) Inventor: Hai-Jung In, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/172,514

(22) Filed: Feb. 10, 2021

(65) Prior Publication Data

US 2021/0335276 A1 Oct. 28, 2021

(30) Foreign Application Priority Data

Apr. 27, 2020 (KR) ........................ 10-2020-0050808

(51) Int. Cl.

| | |
|---|---|
| ***G06F 3/038*** | (2013.01) |
| ***G09G 5/00*** | (2006.01) |
| ***G09G 5/10*** | (2006.01) |
| ***G09G 3/3275*** | (2016.01) |
| ***G09G 3/36*** | (2006.01) |

(52) U.S. Cl.

CPC ......... *G09G 3/3275* (2013.01); *G09G 3/3688* (2013.01); *G09G 2310/0286* (2013.01); *G09G 2310/0291* (2013.01); *G09G 2310/0294* (2013.01)

(58) Field of Classification Search

CPC ............................... G09G 3/3688; G09G 3/02

See application file for complete search history.

(56) References Cited

U.S. PATENT DOCUMENTS

| | | | | |
|---|---|---|---|---|
| 10,157,562 | B2 | 12/2018 | Shin et al. | |
| 2003/0132907 | A1* | 7/2003 | Lee ...................... | G09G 3/3685 345/98 |
| 2005/0253833 | A1* | 11/2005 | Teshirogi ............. | G09G 3/3648 345/204 |
| 2014/0098014 | A1* | 4/2014 | Liao ..................... | G09G 3/3674 345/99 |

FOREIGN PATENT DOCUMENTS

| | | | |
|---|---|---|---|
| KR | 101308262 | B1 | 9/2013 |
| KR | 101739134 | B1 | 5/2017 |
| KR | 1020190083392 | A | 7/2019 |

* cited by examiner

*Primary Examiner* — Nan-Ying Yang

(74) *Attorney, Agent, or Firm* — Cantor Colburn LLP

(57) ABSTRACT

A display device includes a display panel, a data driver which provides data voltages to the display panel, and a controller which provides output image data to the data driver. The controller includes a data line memory which stores input image data for each pixel row of the display panel, an address line memory which stores addresses for the input image data, and a data serialize block which generates the output image data provided to the data driver by rearranging the input image data stored in the data line memory based on the addresses stored in the address line memory.

19 Claims, 25 Drawing Sheets

DATA DRIVER AND DISPLAY DEVICE INCLUDING A DATA DRIVER

This application claims priority to Korean Patent Application No. 10-2020-0050808, filed on Apr. 27, 2020, and all the benefits accruing therefrom under 35 U.S.C. § 119, the content of which in its entirety is herein incorporated by reference.

BACKGROUND

1. Field

Embodiments of the present inventive concept relate to a display device, and more particularly to a data driver and a display device including the data driver.

2. Description of the Related Art

A data driver may be coupled to a display panel, and may provide data voltages to pixels of the display panel through data lines of the display panel. The pixels of the display panel may display an image based on the data voltages received from the data driver.

SUMMARY

The data driver may have a configuration suitable for the number of the data lines of the display panel, and an arrangement of the data lines of the display panel. Accordingly, dedicated data drivers respectively suitable for display panels having different structures may be implemented.

Some embodiments provide a data driver capable of driving display panels having different structures.

Some embodiments provide a display device capable of driving display panels having different structures.

According to embodiments, a display device includes a display panel, a data driver which provides data voltages to the display panel, and a controller which provides output image data to the data driver. The controller includes a data line memory which stores input image data for a pixel row of the display panel, an address line memory which stores addresses for the input image data, and a data serialize block which generates the output image data provided to the data driver by rearranging the input image data stored in the data line memory based on the addresses stored in the address line memory.

In embodiments, the input image data stored in the data line memory may include first through (4N)-th pixel data for pixels of the pixel row, where N is an integer greater than 0, and the addresses stored in the address line memory may include first through (4N)-th addresses. In a case where the display panel is a normal display panel, the address line memory may store values of 1 through 4N as the first through (4N)-th addresses, respectively, and the data serialize block may sequentially output the first through (4N)-th pixel data as the output image data in response to the addresses having the values of 1 through 4N. In a case where the display panel is a dead space reduced display panel, the address line memory may store a value of (N+K) as a (2K−1)-th address of the first through (2N)-th addresses, may store a value of (N−K+1) as a (2K)-th address of the first through (2N)-th addresses, may store a value of (2N+K) as a (2N+2K−1)-th address of the (2N+1)-th through (4N)-th addresses, and may store a value of (4N−K+1) as a (2N+2K)-th address of the (2N+1)-th through (4N)-th addresses, where K is an integer greater than 0 and less than or equal to N, and the data serialize block may output (N+K)-th pixel data and (N−K+1)-th pixel data of the first through (2N)-th pixel data as the output image data in response to the first through (2N)-th addresses having the value of (N+K) and the value of (N−K+1), and may output (2N+K)-th pixel data and (4N−K+1)-th pixel data of the (2N+1)-th through (4N)-th pixel data as the output image data in response to the (2N+1)-th through (4N)-th addresses having the value of (2N+K) and the value of (4N−K+1).

According to embodiments, a data driver, for providing data voltages to a display panel, includes a shift register array block which generates sampling signals in response to first, second, third and fourth start signals, first, second, third and fourth direction signals and first and second clock signals, a sampling latch array which samples output image data in response to the sampling signals, a holding latch array which stores the output image data sampled by the sampling latch array in response to a load signal, a digital-to-analog converter array which converts the output image data output from the holding latch array into the data voltages, and an output buffer array which outputs the data voltages at output terminals. The shift register array block includes a first shift register array which generates a first portion of the sampling signals in response to the first start signal, the first direction signal and the first clock signal, a second shift register array which generates a second portion of the sampling signals in response to the second start signal, the second direction signal and the second clock signal, a third shift register array which generates a third portion of the sampling signals in response to the third start signal, the third direction signal and the first clock signal, and a fourth shift register array which generates a fourth portion of the sampling signals in response to the fourth start signal, the fourth direction signal and the second clock signal.

In embodiments, in a case where the display panel is a normal display panel, the shift register array block may generate the sampling signals in a first order, and, in a case where the display panel is a dead space reduced display panel, the shift register array block may generate the sampling signals in a second order different from the first order.

In embodiments, the normal display panel may include data lines sequentially connected to the output terminals, and the shift register array block may sequentially generate the sampling signals in the case where the display panel is the normal display panel.

In embodiments, a display region of the dead space reduced display panel may be divided into a left region, a center region and a right region. The dead space reduced display panel may include data lines, first auxiliary lines connected to the data lines located in the left region, and second auxiliary lines connected to the data lines located in the right region. The data lines located in the center region may be directly connected to odd output terminals of the output terminals, the data lines located in the left region may be connected to left even output terminals of the output terminals through the first auxiliary lines, and the data lines located in the right region may be connected to right even output terminals of the output terminals through the second auxiliary lines. The sampling signals may include odd sampling signals corresponding to the odd output terminals, left even sampling signals corresponding to the left even output terminals, and right even sampling signals corresponding to the right even output terminals in the case where the display panel is the dead space reduced display panel. The shift register array block may generate the sampling signals in an order of the left even sampling signals, the odd sampling signals and the right even sampling signals in the case where the display panel is the dead space reduced display panel.

In embodiments, a display region of the dead space reduced display panel may be divided into a left region, a left center region, a right center region and a right region. The dead space reduced display panel may include data lines, first auxiliary lines connected to the data lines located in the left region, and second auxiliary lines connected to the data lines located in the right region. The data lines located in the left center region may be directly connected to left odd output terminals of the output terminals, the data lines located in the right center region may be directly connected to right even output terminals of the output terminals, the data lines located in the left region may be connected to left even output terminals of the output terminals through the first auxiliary lines, and the data lines located in the right region may be connected to right odd output terminals of the output terminals through the second auxiliary lines. The sampling signals may include left odd sampling signals corresponding to the left odd output terminals, left even sampling signals corresponding to the left even output terminals, right odd sampling signals corresponding to the right odd output terminals, and right even sampling signals corresponding to the right even output terminals in the case where the display panel is the dead space reduced display panel. The shift register array block may generate the sampling signals in an order of the left even sampling signals, the left odd sampling signals, the right even sampling signals and the right odd sampling signals in the case where the display panel is the dead space reduced display panel.

In embodiments, the first, second, third and fourth start signals may be left odd, left even, right odd and right even start signals, respectively, the first, second, third and fourth direction signals may be left odd, left even, right odd and right even direction signals, respectively, and the first and second clock signals may be odd and even clock signals, respectively. The first shift register array may be a left odd shift register array which generates left odd sampling signals as the first portion of the sampling signals in response to the left odd start signal, the left odd direction signal and the odd clock signal, the second shift register array may be a left even shift register array which generates left even sampling signals as the second portion of the sampling signals in response to the left even start signal, the left even direction signal and the even clock signal, the third shift register array may be a right odd shift register array which generates right odd sampling signals as the third portion of the sampling signals in response to the right odd start signal, the right odd direction signal and the odd clock signal, and the fourth shift register array may be a right even shift register array which generates right even sampling signals as the fourth portion of the sampling signals in response to the right even start signal, the right even direction signal and the even clock signal.

In embodiments, the output terminals may include first through (4N)-th output terminals, where N is an integer greater than 0. The display panel may include first through (4N)-th data lines, and the first through (4N)-th data lines may be sequentially connected to the first through (4N)-th output terminals. The left odd and left even shift register arrays may sequentially generate left sampling signals including the left odd sampling signals and the left even sampling signals. The left odd sampling signals may be generated in response to the left odd direction signal indicating a forward direction and the odd clock signal. The left even sampling signals may be generated in response to the left even direction signal indicating the forward direction and the even clock signal, and the odd and even clock signals may have rising edges at different time points, and the right odd and right even shift register arrays may sequentially generate right sampling signals including the right odd sampling signals and the right even sampling signals. The right odd sampling signals may be generated in response to the right odd direction signal indicating the forward direction and the odd clock signal, the right even sampling signals may be generated in response to the right even direction signal indicating the forward direction and the even clock signal.

In embodiments, the output terminals may include first through (4N)-th output terminals, where N is an integer greater than 0. The display panel may include first through (4N)-th data lines, firth through (N)-th auxiliary lines connected to the firth through (N)-th data lines, and (3N+1)-th through (4N)-th auxiliary lines connected to the (3N+1)-th through (4N)-th data lines. A (K)-th data line of the first through (N)-th data lines may be connected to a (2N−2K+2)-th output terminal through a (K)-th auxiliary line of the firth through (N)-th auxiliary lines, where K is an integer greater than 0 and less than or equal to N, a (N+K)-th data line of the (N+1)-th through (2N)-th data lines may be directly connected to a (2K−1)-th output terminal, a (2N+K)-th data line of the (2N+1)-th through (3N)-th data lines may be directly connected to a (2N+2K−1)-th output terminal, and a (3N+K)-th data line of the (3N+1)-th through (4N)-th data lines may be connected to a (4N−2K+2)-th output terminal through a (3N+K)-th auxiliary line of the (3N+1)-th through (4N)-th auxiliary lines. The data voltages may include first through (4N)-th data voltages for the first through (4N)-th data lines, respectively. The output buffer array may output a (K)-th data voltage of the first through (N)-th data voltages at the (2N−2K+2)-th output terminal, may output a (N+K)-th data voltage of the (N+1)-th through (2N)-th data voltages at the (2K−1)-th output terminal, may output a (2N+K)-th data voltage of the (2N+1)-th through (3N)-th data voltages at the (2N+2K−1)-th output terminal, and may output a (3N+K)-th data voltage of the (3N+1)-th through (4N)-th data voltages at the (4N−2K+2)-th output terminal.

In embodiments, the left even shift register array may generate the left even sampling signals corresponding to the (2N−2K+2)-th output terminal in a reverse order in response to the left even direction signal indicating a reverse direction such that the sampling latch array samples the output image data corresponding to the first through (N)-th data voltages, the left odd shift register array may generate the left odd sampling signals corresponding to the (2K−1)-th output terminal in a forward order in response to the left odd direction signal indicating a forward direction such that the sampling latch array samples the output image data corresponding to the (N+1)-th through (2N)-th data voltages, the right odd shift register array may generate the right odd sampling signals corresponding to the (2N+2K−1)-th output terminal in the forward order in response to the right odd direction signal indicating the forward direction such that the sampling latch array samples the output image data corresponding to the (2N+1)-th through (3N)-th data voltages, and the right even shift register array may generate the right even sampling signals corresponding to the (4N−2K+2)-th output terminal in the reverse order in response to the right even direction signal indicating the reverse direction such that the sampling latch array samples the output image data corresponding to the (3N+1)-th through (4N)-th data voltages.

In embodiments, the output terminals may include first through (4N)-th output terminals, where N is an integer greater than 0. The display panel may include first through (4N)-th data lines, firth through (N)-th auxiliary lines connected to the firth through (N)-th data lines, and (3N+1)-th through (4N)-th auxiliary lines connected to the (3N+1)-th through (4N)-th data lines. A (K)-th data line of the first through (N)-th data lines may be connected to a (2N−2K+2)-th output terminal through a (K)-th auxiliary line of the firth through (N)-th auxiliary lines, where K is an integer greater than 0 and less than or equal to N, a (N+K)-th data line of the (N+1)-th through (2N)-th data lines may be directly connected to a (2K−1)-th output terminal, a (2N+K)-th data line of the (2N+1)-th through (3N)-th data lines may be directly connected to a (2N+2K)-th output terminal, and a (3N+K)-th data line of the (3N+1)-th through (4N)-th data lines may be connected to a (4N−2K+1)-th output terminal through a (3N+K)-th auxiliary line of the (3N+1)-th through (4N)-th auxiliary lines. The data voltages may include first through (4N)-th data voltages for the first through (4N)-th data lines. The output buffer array may output a (K)-th data voltage of the first through (N)-th data voltages at the (2N−2K+2)-th output terminal, may output a (N+K)-th data voltage of the (N+1)-th through (2N)-th data voltages at the (2K−1)-th output terminal, may output a (2N+K)-th data voltage of the (2N+1)-th through (3N)-th data voltages at the (2N+2K)-th output terminal, and may output a (3N+K)-th data voltage of the (3N+1)-th through (4N)-th data voltages at the (4N−2K+1)-th output terminal.

In embodiments, the left even shift register array may generate the left even sampling signals corresponding to the (2N−2K+2)-th output terminal in a reverse order in response to the left even direction signal indicating a reverse direction such that the sampling latch array samples the output image data corresponding to the first through (N)-th data voltages, the left odd shift register array may generate the left odd sampling signals corresponding to the (2K−1)-th output terminal in a forward order in response to the left odd direction signal indicating a forward direction such that the sampling latch array samples the output image data corresponding to the (N+1)-th through (2N)-th data voltages, the right even shift register array may generate the right even sampling signals corresponding to the (2N+2K)-th output terminal in the forward order in response to the right even direction signal indicating the forward direction such that the sampling latch array samples the output image data corresponding to the (2N+1)-th through (3N)-th data voltages, and the right odd shift register array may generate the right odd sampling signals corresponding to the (4N−2K+1)-th output terminal in the reverse order in response to the right odd direction signal indicating the reverse direction such that the sampling latch array samples the output image data corresponding to the (3N+1)-th through (4N)-th data voltages.

In embodiments, the left odd shift register array may receive a left odd middle start signal, the left even shift register array may receive a left even middle start signal, the right odd shift register array may receive a right odd middle start signal, and the right even shift register array may receive a right even middle start signal.

In embodiments, the display panel may be a normal display panel. The normal display panel may include data lines, and the number of the data lines may be less than the number of the output terminals. Outer output terminals of the output terminals may not be connected to the data lines, and center output terminals of the output terminals may be sequentially connected to the data lines. To output the data voltages at the center output terminals, the left odd and left even shift register arrays may sequentially generate a portion of left sampling signals including the left odd sampling signals and the left even sampling signals. the left odd sampling signals may be generated in response to the left odd middle start signal, and the left even sampling signals may be generated in response to the left even middle start signal, and the right odd and right even shift register arrays may sequentially generate right sampling signals including the right odd sampling signals and the right even sampling signals. the right odd sampling signals may be generated in response to the right odd start signal, and the right even sampling signals may be generated in response to the right even start signal.

In embodiments, the display panel may be a dead space reduced display panel. The dead space reduced display panel may include data lines and auxiliary lines, and the number of the data lines may be less than the number of the output terminals. Outer output terminals of the output terminals may not be connected to the data lines, and center output terminals of the output terminals may not be connected to the data lines or the auxiliary lines. To output the data voltages at the center output terminals, the left even shift register array may generate the left even sampling signals in a reverse order in response to the left even start signal, the left odd shift register array may generate a portion of the left odd sampling signals in a forward order in response to the left odd middle start signal, the right odd shift register array may generate the right odd sampling signals in the forward order in response to the right odd start signal, and the right even shift register array may generate a portion of the right even sampling signals in the reverse order in response to the right even middle start signal.

In embodiments, the display panel may be a normal display panel. The normal display panel may include data lines, and the number of the data lines may be less than the number of the output terminals. Center output terminals of the output terminals may not be connected to the data lines, and outer output terminals of the output terminals may not be sequentially connected to the data lines. To output the data voltages at the outer output terminals, the left odd and left even shift register arrays may sequentially generate left sampling signals including the left odd sampling signals and the left even sampling signals in response to the left odd start signal and the left even start signal, and the right odd and right even shift register arrays may sequentially generate a portion of right sampling signals including the right odd sampling signals and the right even sampling signals in response to the right odd middle start signal and the right even middle start signal.

In embodiments, the display panel may be a dead space reduced display panel. The dead space reduced display panel may include data lines and auxiliary lines, and the number of the data lines may be less than the number of the output terminals. Center output terminals of the output terminals may not be connected to the data lines, and outer output terminals of the output terminals may not be connected to the data lines or the auxiliary lines. To output the data voltages at the outer output terminals, the left even shift register array may generate a portion of the left even sampling signals in a reverse order in response to the left even middle start signal, the left odd shift register array may generate the left odd sampling signals in a forward order in response to the left odd start signal, the right odd shift register array may generate a portion of the right odd sampling signals in the forward order in response to the right odd middle start signal, and the right even shift register array may generate the right even sampling signals in the reverse order in response to the right even start signal.

According to embodiments, there is provided a display device including a display panel, a data driver providing data voltages to the display panel, and a controller which provides output image data to the data driver. The data driver includes a shift register array block which generates sampling signals in response to first, second, third and fourth start signals, first, second, third and fourth direction signals and first and second clock signals, a sampling latch array which samples output image data in response to the sampling signals, a holding latch array which stores the output image data sampled by the sampling latch array in response to a load signal, a digital-to-analog converter array which converts the output image data output from the holding latch array into the data voltages, and an output buffer array which outputs the data voltages at output terminals. The shift register array block includes a first shift register array which generates a first portion of the sampling signals in response to the first start signal, the first direction signal and the first clock signal, a second shift register array which generates a second portion of the sampling signals in response to the second start signal, the second direction signal and the second clock signal, a third shift register array which generates a third portion of the sampling signals in response to the third start signal, the third direction signal and the first clock signal, and a fourth shift register array which generates a fourth portion of the sampling signals in response to the fourth start signal, the fourth direction signal and the second clock signal.

In embodiments, the controller may include a data line memory which stores input image data for one pixel row of the display panel, and a data serialize block which generates the output image data provided to the data driver by rearranging the input image data stored in the data line memory.

As described above, a display device according to embodiments may rearrange image data stored in a data line memory by using an address line memory, and may provide the rearranged image data to a data driver. Accordingly, the data driver may output data voltages not only in an order suitable for a normal display panel, but also in an order suitable for a dead space reduced display panel.

Further, in a data driver and a display device according to embodiments, a shift register array block may include a first shift register array that generates a first portion of sampling signals in response to a first start signal, a first direction signal and a first clock signal, a second shift register array that generates a second portion of the sampling signals in response to a second start signal, a second direction signal and a second clock signal, a third shift register array that generates a third portion of the sampling signals in response to a third start signal, a third direction signal and the first clock signal, and a fourth shift register array that generates a fourth portion of the sampling signals in response to a fourth start signal, a fourth direction signal and the second clock signal. Accordingly, the data driver may output data voltages not only in an order suitable for a normal display panel, but also in an order suitable for a dead space reduced display panel.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
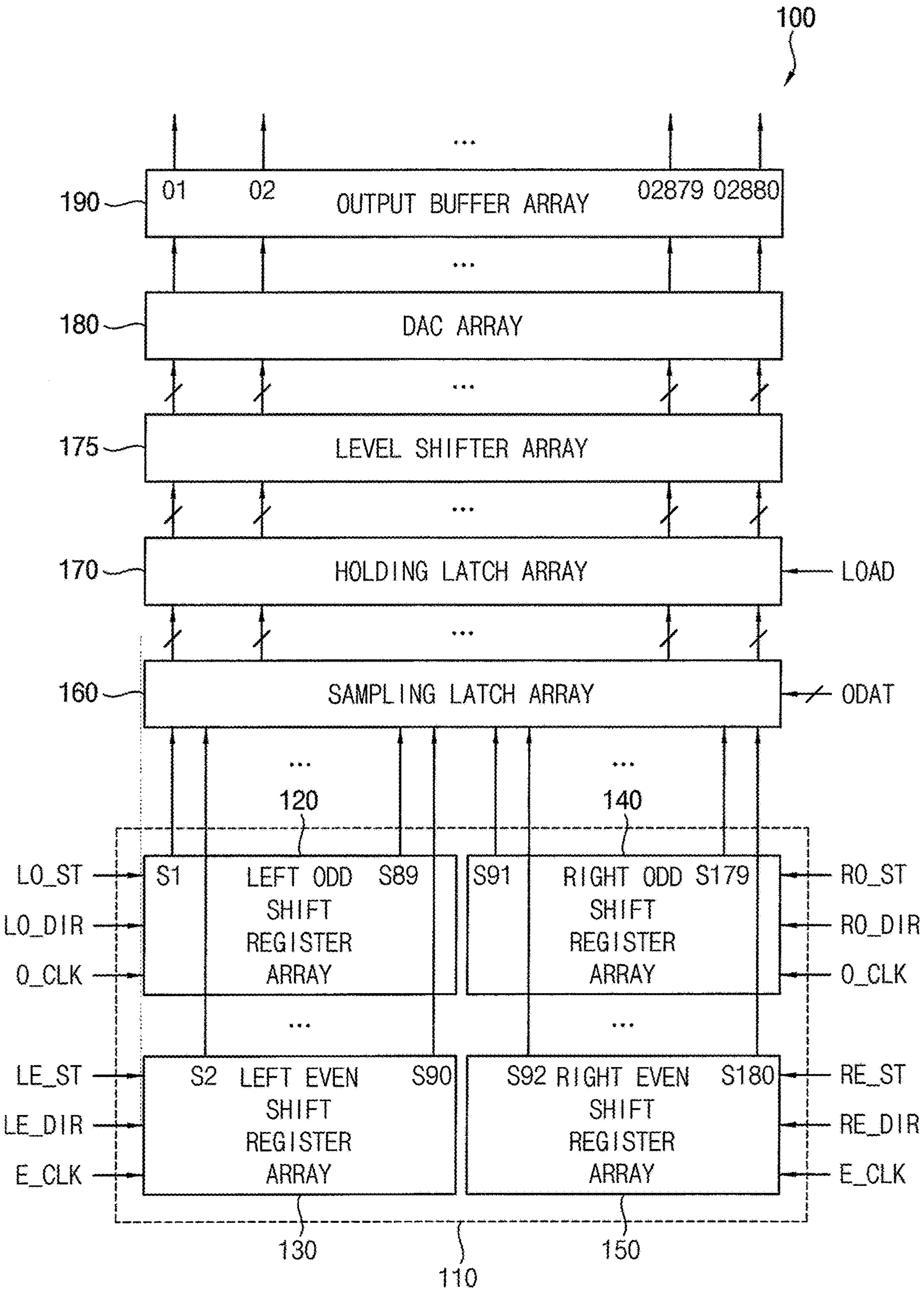
FIG. 1 is a block diagram illustrating a data driver according to embodiments.

The embodiments are described more fully hereinafter with reference to the accompanying drawings. Like or similar reference numerals refer to like or similar elements throughout. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 2:
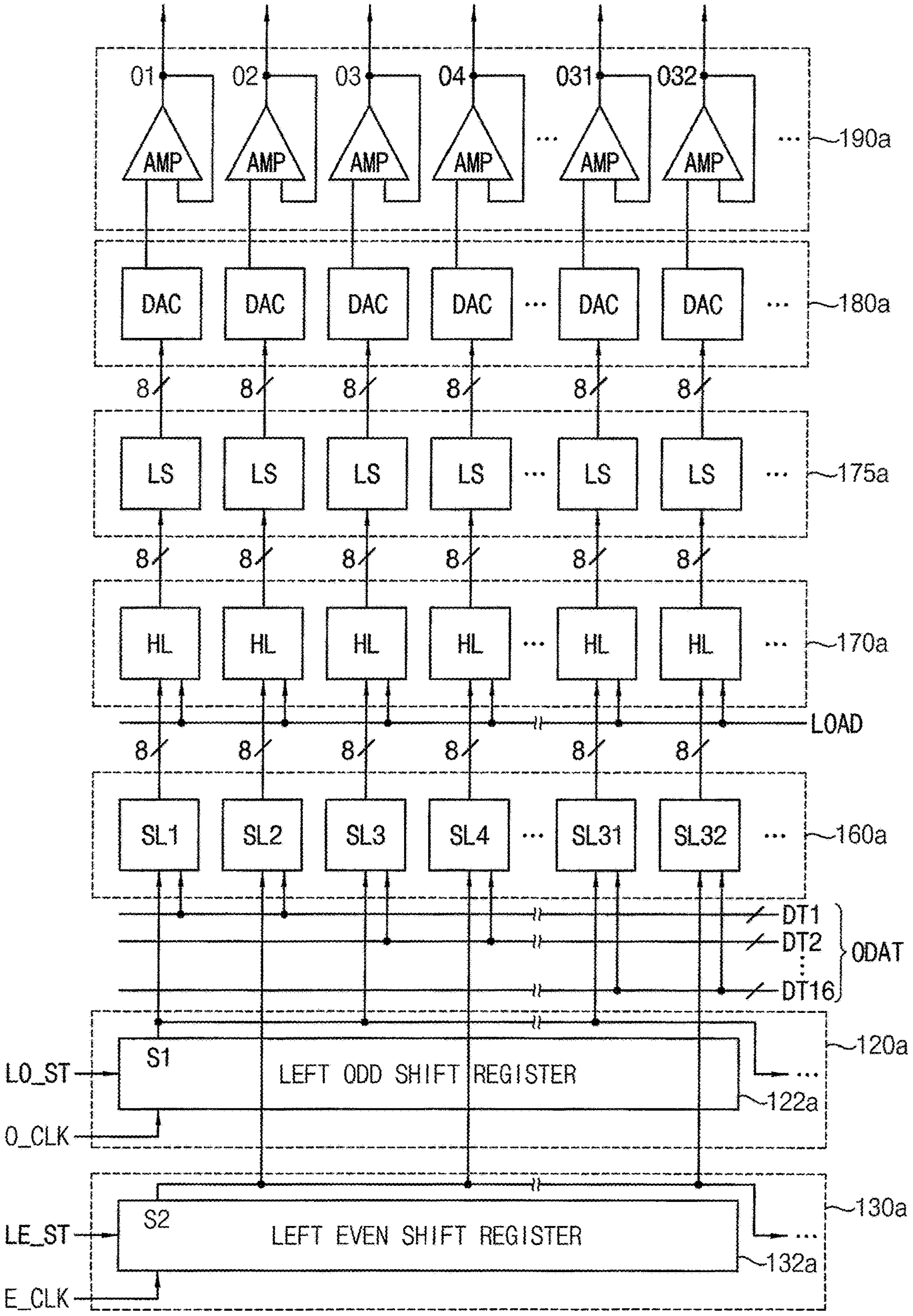
FIG. 2 is a block diagram illustrating an example of a portion of a data driver of FIG. 1.
Figure 3:
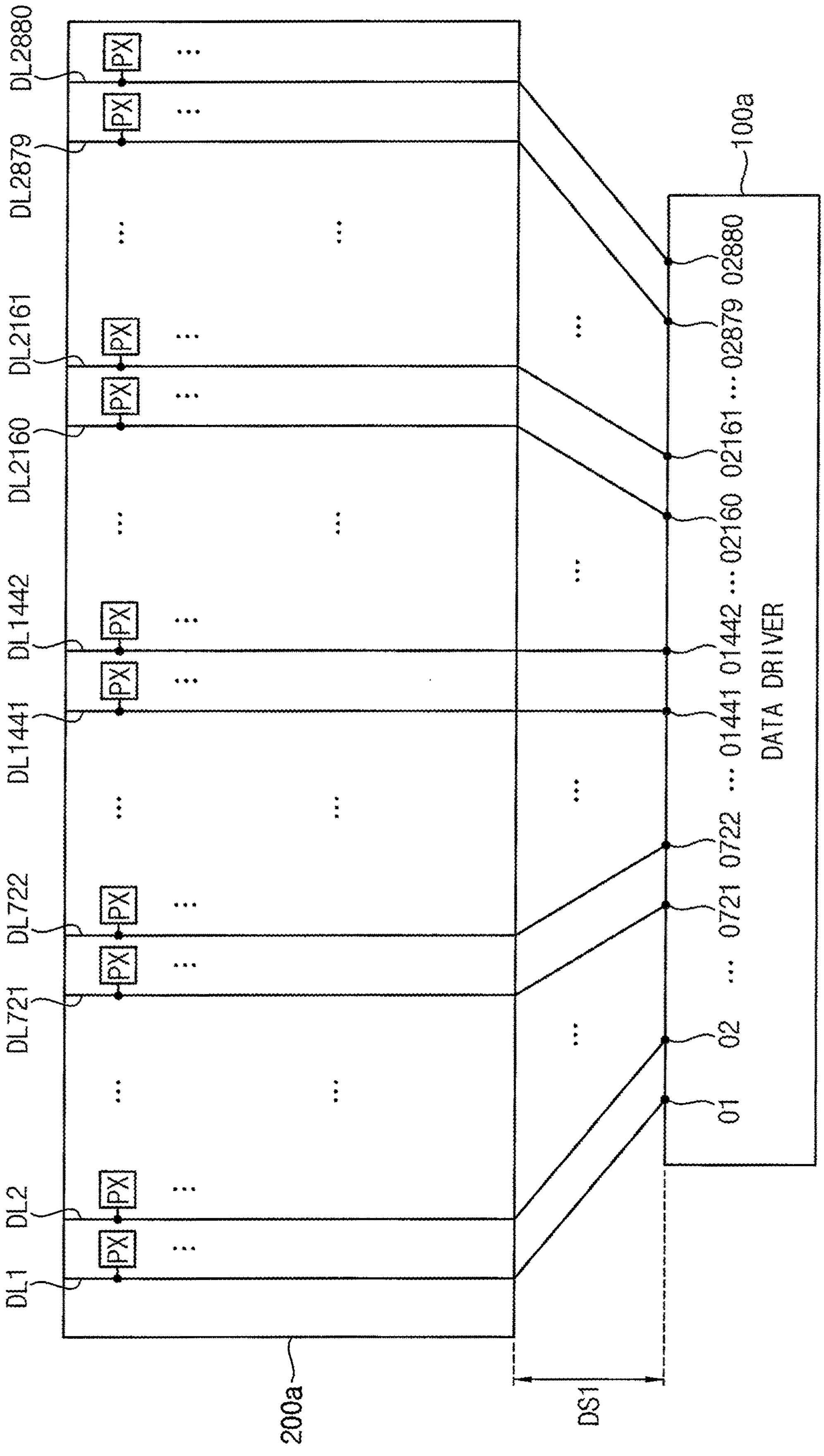
FIG. 3 is a block diagram for describing an example of a data driver coupled to a normal display panel.
Figure 4:
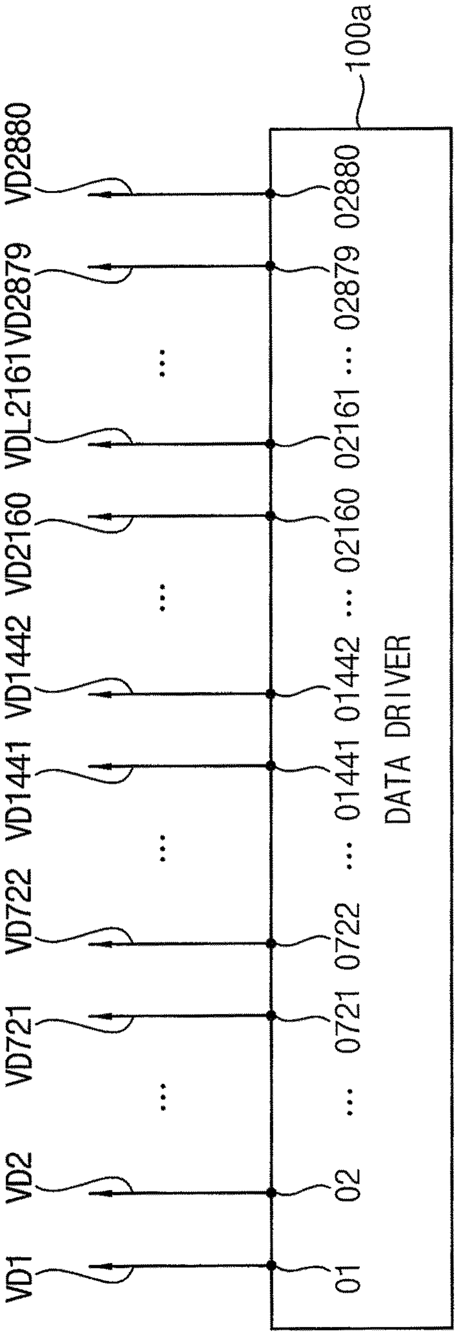
FIG. 4 is a block diagram for describing an example of data voltages output from a data driver of FIG. 3 coupled to a normal display panel.
Figure 5:
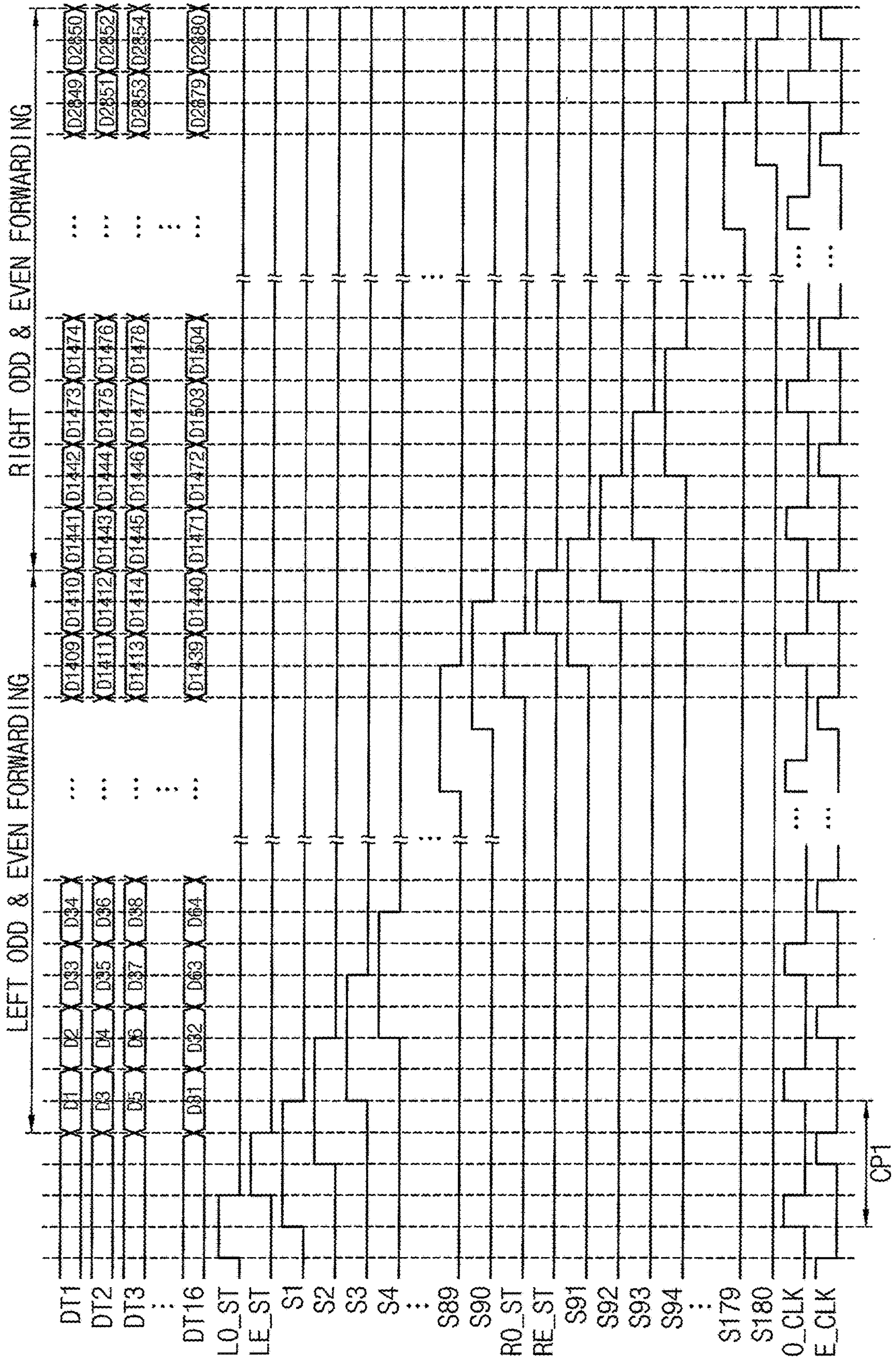
FIG. 5 is a timing diagram for describing an example of an operation of a data driver of FIG. 3 coupled to a normal display panel.
Figure 6:
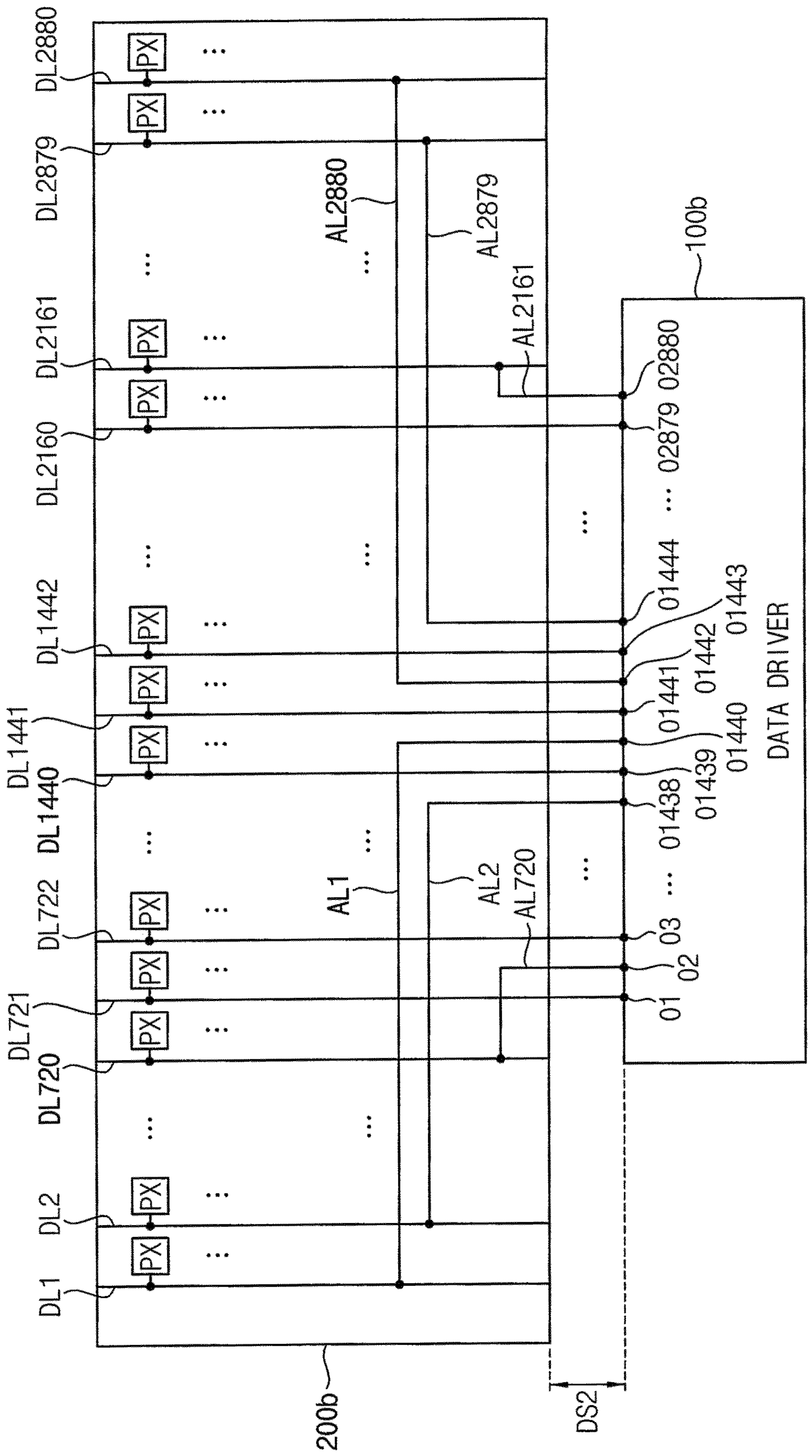
FIG. 6 is a block diagram for describing an example of a data driver coupled to a dead space reduced display panel.
Figure 7:
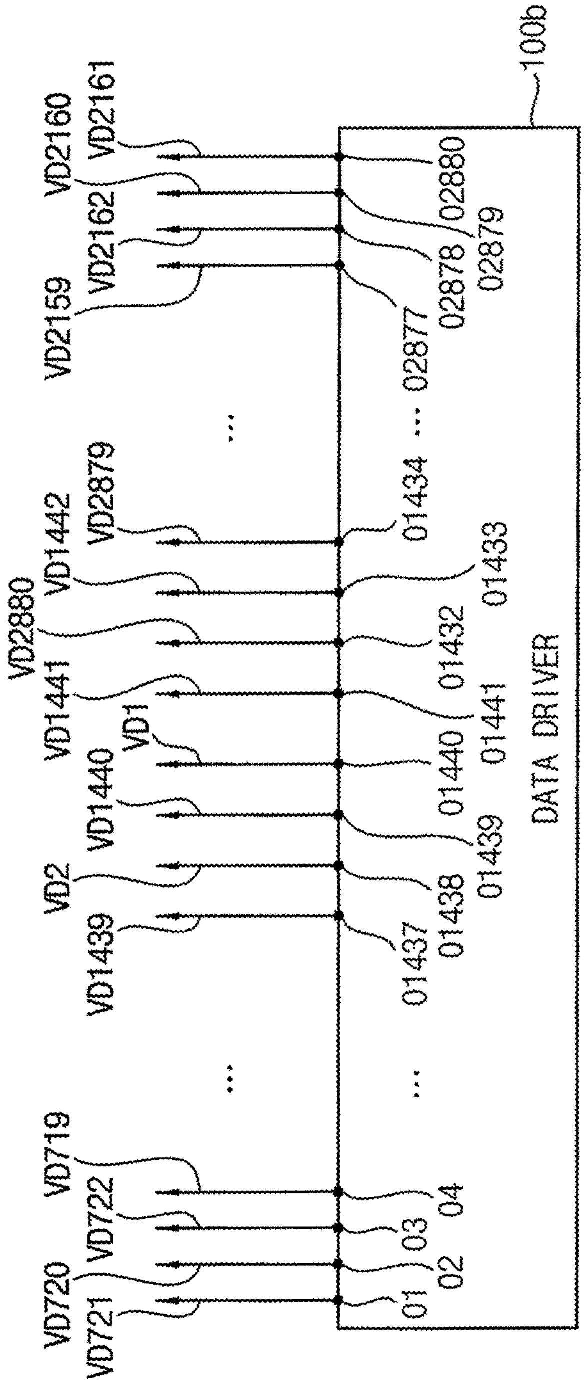
FIG. 7 is a block diagram for describing an example of data voltages output from a data driver of FIG. 6 coupled to a dead space reduced display panel.
Figure 8:
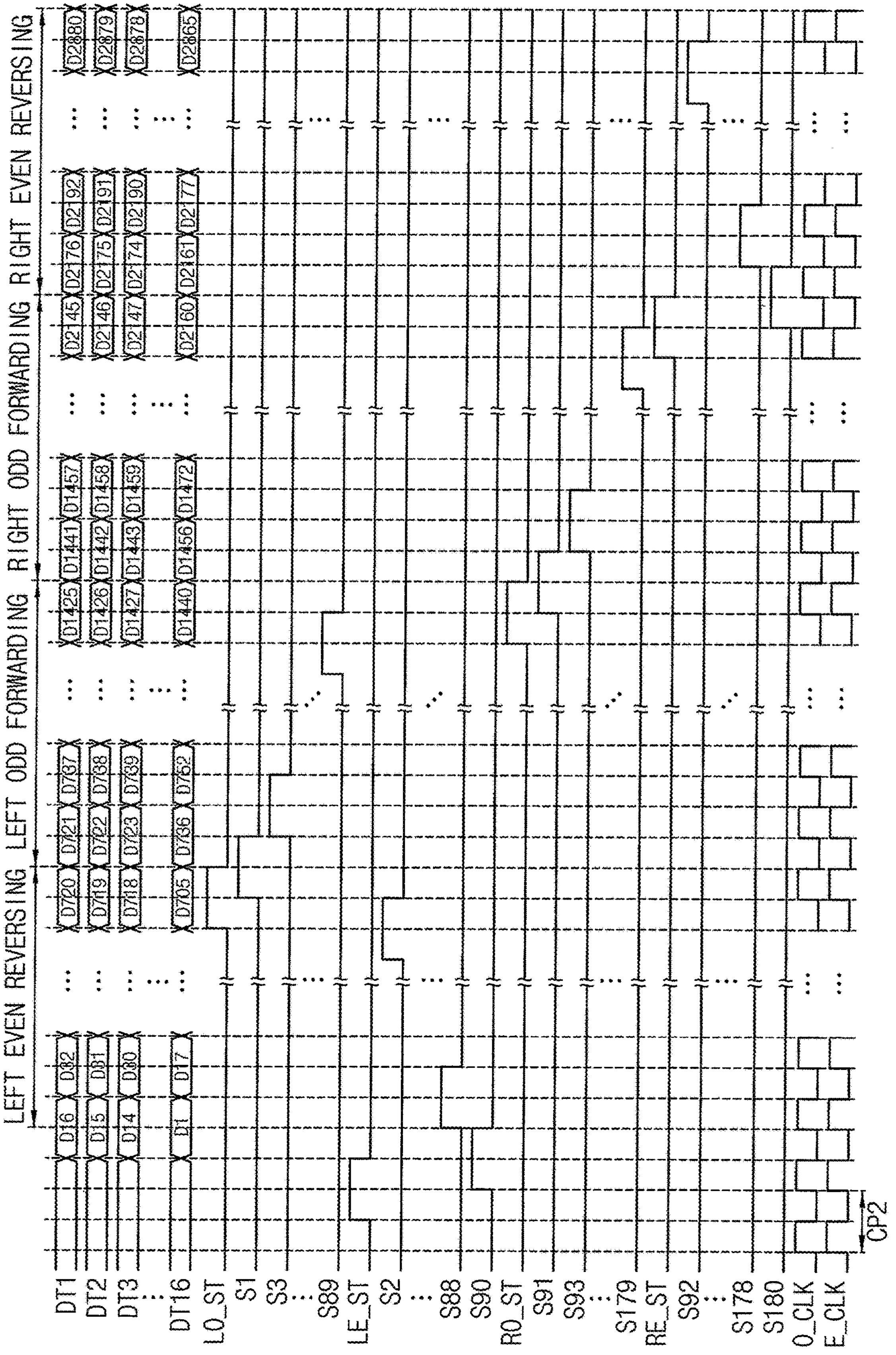
FIG. 8 is a timing diagram for describing an example of an operation of a data driver of FIG. 6 coupled to a dead space reduced display panel.

FIG. 1 is a block diagram illustrating a data driver according to embodiments, FIG. 2 is a block diagram illustrating an example of a portion of a data driver of FIG. 1, FIG. 3 is a block diagram for describing an example of a data driver coupled to a normal display panel, FIG. 4 is a block diagram for describing an example of data voltages output from a data driver of FIG. 3 coupled to a normal display panel, FIG. 5 is a timing diagram for describing an example of an operation of a data driver of FIG. 3 coupled to a normal display panel, FIG. 6 is a block diagram for describing an example of a data driver coupled to a dead space reduced display panel, FIG. 7 is a block diagram for describing an example of data voltages output from a data driver of FIG. 6 coupled to a dead space reduced display panel, and FIG. 8 is a timing diagram for describing an example of an operation of a data driver of FIG. 6 coupled to a dead space reduced display panel.

Referring to FIG. 1, a data driver 100 providing data voltages to a display panel according to embodiments may include a shift register array block 110, a sampling latch array 160, a holding latch array 170, a digital-to-analog converter ("DAC") array 180 and an output buffer array 190. In some embodiments, the data driver 100 may further include a level shifter array 175.

The shift register array block 110 may generate sampling signals S1 through S180 in response to first, second, third, and fourth start signals LO_ST, LE_ST, RO_ST and RE_ST, first, second, third and fourth direction signals LO_DIR, LE_DIR, RO_DIR and RE_DIR and first and second clock signals O_CLK and E_CLK. As illustrated in FIG. 1, the shift register array block 110 may include first to fourth shift register arrays 120 to 150. The first shift register array 120 may generate a first portion S1, . . . , S89 (i.e., odd numbers from S1 to S90) of the sampling signals S1 through S180 in response to the first start signal LO_ST, the first direction signal LO_DIR and the first clock signal O_CLK. The second shift register array 130 may generate a second portion S2, . . . , S90 (i.e., even numbers from S1 to S90) of the sampling signals S1 through S180 in response to the second start signal LE_ST, the second direction signal LE_DIR and the second clock signal E_CLK, The third shift register array 140 may generate a third portion S91, . . . , S179 (i.e., odd numbers from S91 to S180) of the sampling signals S1 through S180 in response to the third start signal RO_ST, the third direction signal RO_DIR and the first clock signal O_CLK. The fourth shift register array 150 may generate a fourth portion S92, . . . , S180 (i.e., even numbers from S91 to S180) of the sampling signals S1 through S180 in response to the fourth start signal RE_ST, the fourth direction signal RE_DIR and the second clock signal E_CLK.

In some embodiments, the first, second, third and fourth start signals LO_ST, LE_ST, RO_ST and RE_ST may also be referred as left odd, left even, right odd and right even start signals LO_ST, LE_ST, RO_ST and RE_ST, respectively. The first, second, third and fourth direction signals LO_DIR, LE_DIR, RO_DIR and RE_DIR may also be referred as left odd, left even, right odd and right even direction signals LO_DIR, LE_DIR, RO_DIR and RE_DIR, respectively. The first and second clock signals O_CLK and E_CLK may also be referred as odd and even clock signals O_CLK and E_CLK, respectively. Further, the shift register array block 110 may include a left odd shift register array 120 that generates left odd sampling signals S1, . . . , S89 (i.e., odd numbers from S1 to S90) in response to the left odd start signal LO_ST, the left odd direction signal LO_DIR and the odd clock signal O_CLK; a left even shift register array 130 that generates left even sampling signals S2, . . . , S90 (i.e., even numbers from S1 to S90) in response to the left even start signal LE_ST, the left even direction signal LE_DIR and the even clock signal E_CLK; a right odd shift register array 140 that generates right odd sampling signals S91, . . . , S179 (i.e., odd numbers from S91 to S180) in response to the right odd start signal RO_ST, the right odd direction signal RO_DIR and the odd clock signal O_CLK; and a right even shift register array 150 that generates right even sampling signals S92, . . . , S180 (i.e., even numbers from S91 to S180) in response to the right even start signal RE_ST, the right even direction signal RE_DIR and the even clock signal E_CLK. For example, as illustrated in FIG. 1, the shift register array block 110 may output 1st through 180th sampling signals S1 through S180. The left odd shift register array 120 may generate odd-numbered sampling signals S1, . . . , S89 among a left half S1 through S90 of the entire sampling signals S1 through S180 (i.e., 1st, 3rd, . . . , 89th sampling signals S1, . . . , S89). The left even shift register array 130 may generate even-numbered sampling signals S2, . . . , S90 among the left half S1 through S90 of the entire sampling signals S1 through S180 (i.e., 2nd, 4th, . . . , 90th sampling signals S2, . . . , S90). The right odd shift register array 140 may generate odd-numbered sampling signals S91, . . . , S180 among a right half S91 through S180 of the entire sampling signals S1 through S180 (i.e., 91st, 93rd, . . . , 179th sampling signals S91, . . . , S179). The right even shift register array 150 may generate even-numbered sampling signals S92, . . . , S180 among the right half S91 through S180 of the entire sampling signals S1 through S180 (i.e., 92nd, 94th, . . . , 180th sampling signals S92, . . . , S180).

Each shift register array (e.g., 120) may include serial-connected (e.g., forty five) shift registers (e.g., flip-flops) that sequentially output corresponding sampling signals (e.g., S1, . . . , S89) by shifting a corresponding start signal (e.g., LO_ST) in response to a corresponding clock signal (e.g., O_CLK). Although FIG. 2 illustrates one left odd shift register 122*a* included in the left odd shift register array 120 and 120*a* for generating the first sampling signal S1 and one left even shift register 132*a* included in the left even shift register array 130 and 130*a* for generating the second sampling signal S2, each shift register array 120, 130, 140 and 150 may include a plurality of shift registers. Further, each shift register array (e.g., 120) may sequentially output the corresponding sampling signals (e.g., S1, . . . , S89) in a forward order from a first sampling signal (e.g., S1) to the last sampling signal (e.g., S89) when a corresponding direction signal (e.g., LO_DIR) indicates a forward direction, and may sequentially output the corresponding sampling signals (e.g., S89, . . . , S1) in a reverse order from the last sampling signal (e.g., S89) to the first sampling signal (e.g., S1) when the corresponding direction signal (e.g., LO_DIR) indicates a reverse direction.

The sampling latch array 160 may sample output image data ODAT in response to the sampling signals S1 through S180 from the shift register array block 110. In some embodiments, as illustrated in FIG. 2, the sampling latch array 160 and 160*a* may include a plurality of sampling latches SL1, SL2, SL3, SL4, . . . , SL31, SL32, . . . that respectively samples pixel data included in the output image data ODAT in response to the sampling signals S1, S2, . . . . For example, as illustrated in FIG. 2, each data transfer line set DT1, DT2, . . . , DT16 may include eight data transfer lines for transferring each pixel data having eight bits, and the sampling latch array 160 and 160*a* may substantially simultaneously receive sixteen pixel data included in the output image data ODAT through sixteen data transfer line sets DT1, DT2, . . . , DT16 from a controller. Further, as illustrated in FIG. 2, sixteen sampling latches (e.g., SL1, SL3, . . . , SL31, that is, odd numbered sampling latches from SL1 to SL32) may operate in response to the same sampling signal (e.g., S1). For example, 1st, 3rd, . . . , and 31st sampling latches SL1, SL3, . . . , SL31 may sample sixteen pixel data transferred through the sixteen data transfer line sets DT1, DT2, . . . , DT16 in response to the first sampling signal S1, 2nd, 4th, . . . , and 32nd sampling latches SL2, SL4, . . . , SL32 (i.e., even numbered sampling latches from SL1 to SL32) may sample sixteen pixel data transferred through the sixteen data transfer line sets DT1, DT2, . . . , DT16 in response to the second sampling signal S2. Although FIG. 2 illustrates an example where the output image data ODAT are transferred through the sixteen data transfer line sets DT1, DT2, . . . , DT16, and the sixteen sampling latches (e.g., SL1, SL3, . . . , SL31) operate in response to the same sampling signal (e.g., S1), the number of the data transfer line sets, and the number of the sampling latches receiving the same sampling signal according to the invention are not limited to the example of FIG. 2.

The holding latch array 170 may store the output image data ODAT sampled by the sampling latch array 160 in response to a load signal LOAD. In some embodiments, as illustrated in FIG. 2, the holding latch array 170 and 170*a* may include a plurality of holding latches HL corresponding to the plurality of sampling latches SL1, SL2, SL3, SL4, . . . , SL31, SL32, . . . of the sampling latch array 160 and 160*a*, respectively.

The level shifter array 175 may change a voltage level of the output image data ODAT output from the holding latch array 170 to a voltage level suitable for the DAC array 180. In some embodiments, as illustrated in FIG. 2, the level shifter array 175 and 175*a* may include a plurality of level shifters LS corresponding to the plurality of holding latches HL of the holding latch array 170 and 170*a*, respectively.

The DAC array 180 may convert the output image data ODAT output (through the level shifter array 175) from the holding latch array 170 into data voltages that are analog voltages. In some embodiments, as illustrated in FIG. 2, the DAC array 180 and 180*a* may include a plurality of DACs corresponding to the plurality of level shifters LS of the level shifter array 175 and 175*a*, respectively.

The output buffer array 190 may output the data voltages generated by the DAC array 180 at output terminals O1, O2, . . . , O2879 and O2880. In some embodiments, as illustrated in FIG. 2, the output buffer array 190 and 190*a* may include a plurality of output buffers AMP corresponding to the plurality of DACs of the DAC array 180 and 180*a*, respectively. As illustrated in FIG. 2, sixteen data voltages corresponding to the sixteen pixel data sampled by each sampling signal (e.g., S1) may be output at sixteen output terminals (e.g., O1, O3, . . . , O31, that is, the odd numbers of O1 to O32). For example, sixteen data voltages corresponding to the sixteen pixel data sampled by the first sampling signal S1 may be output at 1st, 3rd, . . . , and 31st output terminals O1, O3, . . . , O31, and sixteen data voltages corresponding to the sixteen pixel data sampled by the second sampling signal S2 may be output at 2nd, 4rth, . . . , and 32nd output terminals O2, O4, . . . , O32. Although FIGS. 1 and 2 illustrate an example where the shift register array block 110 generates 180 sampling signals S1 through S180, and the output buffer array 190 outputs 2,880 data voltages at 2,880 output terminals O1 through O2880, the number of the sampling signals according to the invention is not limited to 180, the number of the output terminals is not limited to 2,880, and the number of the data voltage corresponding to each sampling signal is not limited to 16.

The data driver 100 according to embodiments may driver not only a normal display panel including data lines sequentially connected to the output terminals O1 through O2880, but also a dead space reduced display panel including data lines and auxiliary lines for connecting a portion of the data lines to a corresponding portion of the output terminals O1 through O2880. To drive not only the normal display panel but also the dead space reduced display panel, the shift register array block 110 of the data driver 100 according to embodiments may generate the sampling signals S1 through S180 in a first order in a case where the data driver 100 is connected to the normal display panel, and may generate the sampling signals S1 through S180 in a second order different from the first order in a case where the data driver 100 is connected to the dead space reduced display panel.

In some embodiments, as illustrated in FIG. 3, the data driver 100*a* may be connected to the normal display panel 200*a*. In some embodiments, the data driver 100*a* may be mounted on a substrate of the normal display panel 200*a* in a chip on glass ("COG") manner or a chip-on-plastic ("COP") manner. In other embodiments, the data driver 100*a* may be mounted on a flexible film connected to the normal display panel 200*a* in a chip-on-film ("COF") manner. Further, in some embodiments, the data driver 100*a* may be implemented in a form of an integrated circuit. For example, the data driver 100*a* may be implemented with a single integrated circuit along with the controller, and this single integrated circuit may be referred as a timing controller embedded data driver ("TED").

In some embodiments, the data driver 100*a* may include first through (4N)-th output terminals O1 through O2880, where N is an integer greater than 0. The normal display panel 200*a* may include first through (4N)-th data lines DL1 through DL2880, and the first through (4N)-th data lines DL1 through DL2880 may be sequentially connected to the first through (4N)-th output terminals O1 through O2880. For example, as illustrated in FIG. 3, N may be 720, and the normal display panel 200*a* may include 1st through 2880th data lines DL1, DL2, . . . , DL771, DL772, . . . , DL1441, DL1442, . . . , DL2160, DL2161, . . . , DL2879 and DL2880 sequentially connected to 1st through 2880th output terminals O1, O2, . . . , O771, O772, . . . , O1441, O1442, . . . , O2160, O2161, . . . , O2879 and O2880 of the data driver 100*a*. The normal display panel 200*a* may have a dead space DS1 where an image is not displayed and which is disposed between a display region where pixels PX of the normal display panel 200*a* are disposed and the data driver 100*a*.

As illustrated in FIGS. 3 and 4, the data driver 100*a* connected to the normal display panel 200*a* may output 1st through 2880th data voltages VD1 through VD2880 at the 1st through 2880th output terminals O1 through O2880, respectively. The 1st through 2880th data voltages VD1 through VD2880 output at the 1st through 2880th output terminals O1 through O2880 may be provided to the pixels PX connected to the 1st through 2880th data lines DL1 through DL2880 through the 1st through 2880th data lines DL1 through DL2880 connected to the 1st through 2880th output terminals O1 through O2880, respectively. To output the 1st through 2880th data voltages VD1 through VD2880 at the 1st through 2880th output terminals O1 through O2880, respectively, the shift register array block 110 of the data driver 100*a* may sequentially generate the 1st through 180th sampling signals S1 through S180.

To sequentially generate the 1st through 180th sampling signals S1 through S180, as illustrated in FIG. 5, the left odd and left even shift register arrays 120 and 130 may sequentially generate left sampling signals S1 through S90 (e.g., the 1st through 90th sampling signals S1 through S90) including the left odd sampling signals S1, S3, S5, . . . , S89 and the left even sampling signals S2, S4, S6, . . . , S90 in response to the left odd direction signal LO_DIR indicating the forward direction, the left even direction signal LE_DIR indicating the forward direction, and the odd and even clock signals O_CLK and E_CLK having rising edges at different time points. The right odd and right even shift register arrays 140 and 150 may sequentially generate right sampling signals S91 through S180 (e.g., the 91st through 180th sampling signals S91 through S180) including the right odd sampling signals S91, S93, S95, . . . , S179 and the right even sampling signals S92, S94, S96, . . . , S180 in response to the right odd direction signal RO_DIR indicating the forward direction, the right even direction signal RE_DIR indicating the forward direction, and the odd and even clock signals O_CLK and E_CLK. For example, the left odd shift register array 120 may sequentially generate the left odd sampling signals S1, . . . , S89 by shifting the left odd start signal LO_ST at the rising edge of the odd clock signal O_CLK; the left even shift register array 130 may sequentially generate the left even sampling signals S2, . . . , S90 by shifting the left even start signal LE_ST at the rising edge of the even clock signal E_CLK; the odd clock signal O_CLK and the even clock signal E_CLK may have a phase difference corresponding to a half of a clock period CP1; and thus the 1st through 90th sampling signals S1 through S90 may be sequentially generated. Further, the right odd shift register array 140 may sequentially generate the right odd sampling signals S91, . . . , S179 by shifting the left odd start signal LO_ST at the rising edge of the odd clock signal O_CLK; the right even shift register array 150 may sequentially generate the right even sampling signals S92, . . . , S180 by shifting the right even start signal RE_ST at the rising edge of the even clock signal E_CLK; the odd clock signal O_CLK and the even clock signal E_CLK may have the phase difference corresponding to the half of the clock period CP1; and thus the 91st through 180th sampling signals S91 through S180 may be sequentially generated.

The sampling latch array 160 may sample 1st through 2880th pixel data D1 through D2880 included in the output image data ODAT in response to the sequentially generated 1st through 180th sampling signals S1 through S180. For example, the sampling latch array 160 may sample 1st, 3rd, 5th, . . . , and 31st pixel data D1, D3, D5, . . . , D31 in response to a falling edge of the first sampling signal S1, and may sample 2nd, 4th, 6th, . . . , and 32nd pixel data D2, D4, D6, . . . , D32 in response to a falling edge of the second sampling signal S2. The holding latch array 170 may store the 1st through 2880th pixel data D1 through D2880 sampled by the sampling latch array 160 in response to the load signal LOAD. The DAC array 180 may convert the 1st through 2880th pixel (digital) data D1 through D2880 output from the holding latch array 170 into the 1st through 2880th data (analog) voltages VD1 through VD2880. The output buffer array 190 may output the 1st through 2880th data voltages VD1 through VD2880 at the 1st through 2880th output terminals O1 through O2880, respectively. Accordingly, the data driver 100*a* may output the data voltages VD1 through VD2880 in the order suitable for the normal display panel 200*a*.

In other embodiments, as illustrated in FIG. 6, the data driver 100*b* may be connected to the dead space reduced display panel 200*b*. A display region of the dead space reduced display panel 200*b* may be divided into a left region (corresponding to a left quarter of the display region), a center region (corresponding to a center half of the display region) and a right region (corresponding to a right quarter of the display region). The dead space reduced display panel 200*b* may include data lines DL1 through DL2880, first auxiliary lines AL1 through AL720 connected to the data lines DL1 through DL720 located in the left region, and second auxiliary lines AL2161 through AL2880 connected to the data lines DL2161 through DL2880 located in the right region. The data lines DL721 through DL2160 located in the center region of the display region of the dead space reduced display panel 200*b* may be directly connected to odd output terminals O1, O3, . . . , O2879 of the output terminals O1 through O2880, respectively. The data lines DL1 through DL720 located in the left region may be connected to left even output terminals O1440, O1438, . . . and O2 of the output terminals O1 through O2880 through the first auxiliary lines AL1 through AL720, respectively. The data lines DL2161 through DL2880 located in the right region may be connected to right even output terminals O2880, . . . , O1444 and O1442 of the output terminals O1 through O2880 through the second auxiliary lines AL2161 through AL2880, respectively. Accordingly, a width of the data lines DL721 through DL2160 and the auxiliary lines AL1 through AL720 and AL2161 through AL2880 directly connected to the output terminals O1 through O2880 between the data driver 100*b* and the display region of the dead space reduced display panel 200*b* may be reduced (i.e., smaller), compared with a width of the data lines DL1 through DL2880 directly connected to the output terminals O1 through O2880 between the data driver 100*a* and the display region of the normal display panel 200*a* illustrated in FIG. 3. Further, by this reduction of the width, a dead space DS2 between the data driver 100*b* and the display region of the dead space reduced display panel 200*b* also may be smaller than the dead space DS1 between the data driver 100*a* and the display region of the normal display panel 200*a* illustrated in FIG. 3.

In some embodiments, the ordinal numbers of the output terminals, data lines, and the auxiliary lines of the data driver 100*b* may have the following relationship. The data driver 100*b* may include first through (4N)-th output terminals O1 through O2880, where N is an integer greater than 0 (e.g., N is 720). The dead space reduced display panel 200*b* may include first through (4N)-th data lines DL1 through DL2880, firth through (N)-th auxiliary lines AL1 through AL720 connected to the firth through (N)-th data lines DL1 through DL720, and (3N+1)-th through (4N)-th auxiliary lines AL2161 through AL2880 connected to the (3N+1)-th through (4N)-th data lines DL2161 through DL2880. A (K)-th data line (e.g., DL1) of the first through (N)-th data lines DL1 through DL720 may be connected to a (2N−2K+2)-th output terminal (e.g., O1440) through a (K)-th auxiliary line (e.g., AL1) of the firth through (N)-th auxiliary lines AL1 through AL720, where K is an integer greater than 0 and less than or equal to N. A (N+K)-th data line (e.g., DL721) of the (N+1)-th through (2N)-th data lines DL721 through DL1440 may be directly connected to a (2K−1)-th output terminal (e.g., O1). A (2N+K)-th data line (e.g., DL1441) of the (2N+1)-th through (3N)-th data lines DL1441 through DL2160 may be directly connected to a (2N+2K−1)-th output terminal (e.g., O1441). A (3N+K)-th data line (e.g., DL2161) of the (3N+1)-th through (4N)-th data lines DL2161 through DL2880 may be connected to a (4N−2K+2)-th output terminal (e.g., O2880) through a (3N+K)-th auxiliary line (e.g., AL2161) of the (3N+1)-th through (4N)-th auxiliary lines AL2161 through AL2880. For example, as illustrated in FIG. 6, N may be 720, the 1st through 720th data lines DL1 through DL720 may be connected to the 1440th, 1438th, . . . , and 2nd output terminals O1440, O1438, . . . , O2 through the 1st through 720th auxiliary lines AL1 through AL720; the 721th through 1440th data lines DL721 through DL1440 may be directly connected to the 1st, 3st, . . . , and 1439th output terminals O1, O3, . . . , O1439; the 1441th through 2160th data lines DL1441 through DL2160 may be directly connected to the 1441st, 1443rd, . . . , and 2879th output terminals O1441, O1443, . . . , O2879; and the 2161st through 2880th data lines DL2161 through DL2880 may be connected to the 2880th, . . . , 1444th, and 1442nd output terminals O2880, . . . , O1444 and O1442 through the 2161st through 2880th auxiliary lines AL2161 through AL2880.

As illustrated in FIGS. 6 and 7, the data voltages VD1 through VD2880 output from the data driver 100*b* connected to the dead space reduced display panel 200*b* may include 1st through (4N)-th data voltages VD1 through VD2880 for the 1st through (4N)-th data lines DL1 through DL2880. The output buffer array 190 may output a (K)-th data voltage (e.g., VD1) of the 1st through (N)-th data voltages VD1 through VD720 at the (2N−2K+2)-th output terminal (e.g., O1440). The output buffer array 190 may output a (N+K)-th data voltage (e.g., VD721) of the (N+1)-th through (2N)-th data voltages VD721 through VD1440 at the (2K−1)-th output terminal (e.g., O1). The output buffer array 190 may output a (2N+K)-th data voltage (e.g., VD1441) of the (2N+1)-th through (3N)-th data voltages VD1441 through VD2160 at the (2N+2K−1)-th output terminal (e.g., O1441) The output buffer array 190 may output a (3N+K)-th data voltage (e.g., VD2161) of the (3N+1)-th through (4N)-th data voltages VD2161 through VD2880 at the (4N−2K+2)-th output terminal (e.g., O2880). For example, as illustrated in FIGS. 6 and 7, N may be 720, the output buffer array 190 may output the 1st through 720th data voltages VD1 through VD720 at the 1440th, 1438th, . . . , 4th and 2nd output terminals O1440, O1438, . . . , O4 and O2, may output the 721st through 1440th data voltages VD721 through VD1440 at the 1st, 3rd, . . . , 1437th and 1439th output terminals O1, O3, . . . , O1437 and O1439, may output the 1441st through 2160th data voltages VD1441 through VD2160 at the 1441st, 1443rd, . . . , 2877th and 2879th output terminals O1441, O1443, . . . , O2877 and O2879, and may output the 2161st through 2880th data voltages VD2161 through VD2880 at the 2880th, 2878th, . . . , 1444th and 1442nd output terminals O2880, O2878, . . . , O1444 and O1442. As described above, in order that the data driver 100*b* may output the data voltages VD1 through VD2880 in the order suitable for the dead space reduced display panel 200*b*, the shift register array block 110 may output the sampling signals S1 through S180 in an order different from an order of the sampling signals S1 through S180 for the normal display panel 200*a*. For example, the shift register array block 110 may generate the left even sampling signals S2, . . . , S90 in the reverse order, then may generate the left odd sampling signals S1, . . . , S89 and the right odd sampling signals S91, . . . , S179 in the forward order, and then may generate the right even sampling signals S92, . . . , S180 in the reverse order.

In some embodiments, as illustrated in FIG. 8, the left even shift register array 130 may generate the left even sampling signals S2, . . . , S88 and S90 (e.g., the 2nd, . . . , 88th and 90th sampling signals S2, . . . , S88 and S90) corresponding to the left even output terminals O2, O4, . . . , O1438 and O1440 (e.g., the 2nd, 4th, . . . , 1438th and 1440th output terminals O2, O4, . . . , O1438 and O1440) in the reverse order in response to the left even direction signal LE_DIR indicating the reverse direction. The left odd shift register array 120 may generate the left odd sampling signals S1, S3, . . . , S89 (e.g., the 1st, 3rd, . . . , and 89th sampling signals S1, S3, . . . , S89) corresponding to the left odd output terminals O1, O3, . . . , O1437 and O1439 (e.g., the 1st, 3rd, . . . , 1437th and 1439th output terminals O1, O3, . . . , O1437 and O1439) in the forward order in response to the left odd direction signal LO_DIR indicating the forward direction. The right odd shift register array 140 may generate the right odd sampling signals S91, S93, . . . , S179 (e.g., the 91st, 93rd, . . . , and 179th sampling signals S91, S93, . . . , S179) corresponding to the right odd output terminals O1441, O1443, . . . , O2877 and O2879 (e.g., the 1441st, 1443st, . . . , 2877th and 2879th output terminals O1441, O1443, . . . , O2877 and O2879) in the forward order in response to the right odd direction signal RO_DIR indicating the forward direction. The right even shift register array 150 may generate the right even sampling signals S92, . . . , S178 and S180 (e.g., the 92nd, . . . , 178th and 180th sampling signals S92, . . . , S178 and S180) corresponding to the right even output terminals O1442, O1444, . . . , O2878 and O2880 (e.g., the 1442nd, 1444th, . . . , 2878th and 2880th output terminals O1442, O1444, . . . , O2878 and O2880) in the reverse order in response to the right even direction signal RE_DIR indicating the reverse direction. Further, as illustrated in FIG. 8, the odd and even clock signals O_CLK and E_CLK applied to the shift register array block 110 of the data driver 100*b* connected to the dead space reduced display panel 200*b* may have rising edges at substantially the same time point. Further, a clock period CP2 of the odd and even clock signals O_CLK and E_CLK applied to the shift register array block 110 of the data driver 100*b* connected to the dead space reduced display panel 200*b* may be shorter than the clock period CP1 of the odd and even clock signals O_CLK and E_CLK applied to the shift register array block 110 of the data driver 100*a* connected to the normal display panel 200*a* illustrated in FIG. 5, and may correspond to, but not limited to, a half of the clock period CP1.

The sampling latch array 160 may sample the 1st through 720th pixel data D1 through D720 at 1440th, 1438th, . . . , 4th and 2nd sampling latches corresponding to the 1440th, 1438th, . . . , 4th and 2nd output terminals O1440, O1438, . . . , O4 and O2, respectively, in response to the 90th, 88th, . . . , and 2nd sampling signals S90, S88, . . . , S2 in the reverse order. The sampling latch array 160 may also sample the 721st through 1440th pixel data D721 through D1440 at 1st, 3st, . . . , 1437th and 1439th sampling latches corresponding to the 1st, 3st, . . . , 1437th and 1439th output terminals O1, O3, . . . , O1437 and O1439, respectively, in response to the 1st, 3rd, . . . , and 89th sampling signals S1, S3, . . . , S89 in the forward order, and may sample the 1441st through 2160th pixel data D1441 through D2160 at 1441st, 1443rd, . . . , 2877th and 2879th sampling latches corresponding to the 1441st, 1443rd, . . . , 2877th and 2879th output terminals O1441, O1443, . . . , O2877 and O2879, respectively, in response to the 91st, 93rd, . . . , and 179th sampling signals S91, S93, . . . , S179 in the forward order. The sampling latch array 160 may also sample the 2161st through 2880th pixel data D2161 through D2880 at 2880th, 2878th, . . . , 1444th and 1442nd sampling latches corresponding to the 2880th, 2878th, . . . , 1444th and 1442nd output terminals O2880, O2878, . . . , O1444 and O1442, respectively, in response to the 180th, 178th, . . . , and 92nd sampling signals S180, S178, . . . , S92 in the reverse order.

Further, 1440th, 1438th, . . . , 4th and 2nd holding latches HL corresponding to the 1440th, 1438th, . . . , 4th and 2nd sampling latches may store the 1st through 720th pixel data D1 through D720. 1st, 3st, . . . , 1437th and 1439th holding latches HL corresponding to the 1st, 3st, . . . , 1437th and 1439th sampling latches may store the 721st through 1440th pixel data D721 through D1440. 1441st, 1443rd, . . . , 2877th and 2879th holding latches HL corresponding to the 1441st, 1443rd, . . . , 2877th and 2879th sampling latches may store the 1441st through 2160th pixel data D1441 through D2160. 2880th, 2878th, . . . , 1444th and 1442nd holding latches HL corresponding to the 2880th, 2878th, . . . , 1444th and 1442nd sampling latches SL may store the 2161st through 2880th pixel data D2161 through D2880.

Further, 1440th, 1438th, . . . , 4th and 2nd DACs in the DAC array 180 corresponding to the 1440th, 1438th, . . . , 4th and 2nd holding latches HL may generate the 1st through 720th data voltages VD1 through VD720 corresponding to the 1st through 720th pixel data D1 through D720. 1st, 3st, . . . , 1437th and 1439th DACs corresponding to the 1st, 3st, . . . , 1437th and 1439th holding latches HL may generate the 721st through 1440th data voltages VD721 through VD1440 corresponding to the 721st through 1440th pixel data D721 through D1440. 1441st, 1443rd, . . . , 2877th and 2879th DACs corresponding to the 1441st, 1443rd, . . . , 2877th and 2879th holding latches HL may generate the 1441st through 2160th data voltages VD1441 through VD2160 corresponding to the 1441st through 2160th pixel data D1441 through D2160. 2880th, 2878th, . . . , 1444th and 1442nd DACs corresponding to the 2880th, 2878th, . . . , 1444th and 1442nd holding latches HL may generate the 2161st through 2880th data voltages VD2161 through VD2880 corresponding to the 2161st through 2880th pixel data D2161 through D2880. Accordingly, the data driver 100*b* connected to the dead space reduced display panel 200*b* may output the 1st through 720th data voltages VD1 through VD720 at the 1440th, 1438th, . . . , 4th and 2nd output terminals O1440, O1438, . . . , O4 and O2. The data driver 100*b* may output the 721st through 1440th data voltages VD721 through VD1440 at the 1st, 3rd, . . . , 1437th and 1439th output terminals O1, O3, . . . , O1437 and O1439. The data driver 100*b* may output the 1441st through 2160th data voltages VD1441 through VD2160 at the 1441st, 1443rd, . . . , 2877th and 2879th output terminals O1441, O1443, . . . , O2877 and O2879. The data driver 100*b* may output the 2161st through 2880th data voltages VD2161 through VD2880 at the 2880th, 2878th, . . . , 1444th and 1442nd output terminals O2880, O2878, . . . , O1444 and O1442. Thus, the data driver 100*b* may output the data voltages VD1 through VD2880 in the order suitable for the dead space reduced display panel 200*b*.

As described above, in the data driver 100 according to embodiments, the shift register array block 110 may include the left odd shift register array 120, the left even shift register array 130, the right odd shift register array 140 and the right even shift register array 150. The left odd, left even, right odd and right even shift register arrays 120, 130, 140 and 150 may change the order of generating the sampling signals S1 through S180 according to a structure of the display panel 200*a* and 200*b* to which the data driver 100 is connected, and thus the order of the data voltages VD1 through VD2880 at the output terminals O1 through O2880 may be changed. Accordingly, the data driver 100 according to embodiments may output the data voltages VD1 through VD2880 in the order suitable for the normal display panel 200*a*, or may output the data voltages VD1 through VD2880 in the order suitable for the dead space reduced display panel 200*b*.

Figure 9:
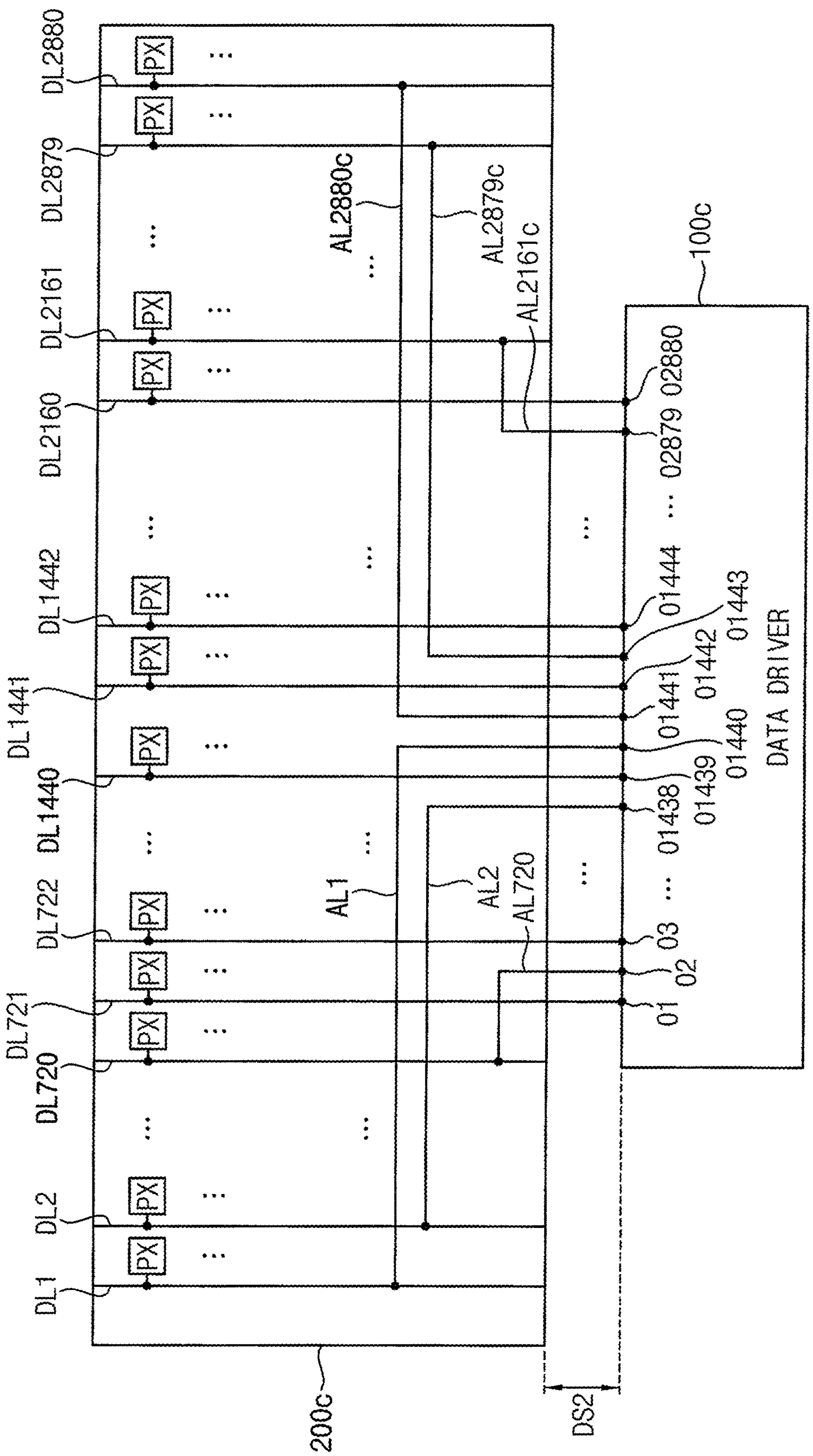
FIG. 9 is a block diagram for describing another example of a data driver coupled to a dead space reduced display panel.
Figure 10:
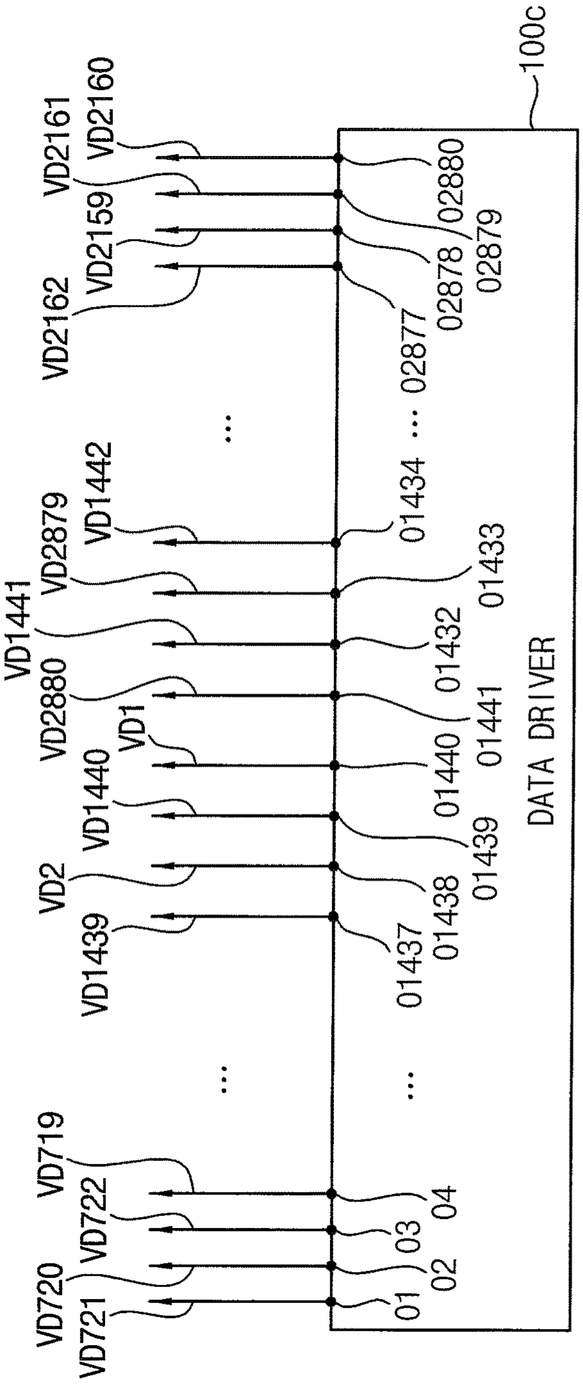
FIG. 10 is a block diagram for describing an example of data voltages output from a data driver of FIG. 9 coupled to a dead space reduced display panel.
Figure 11:
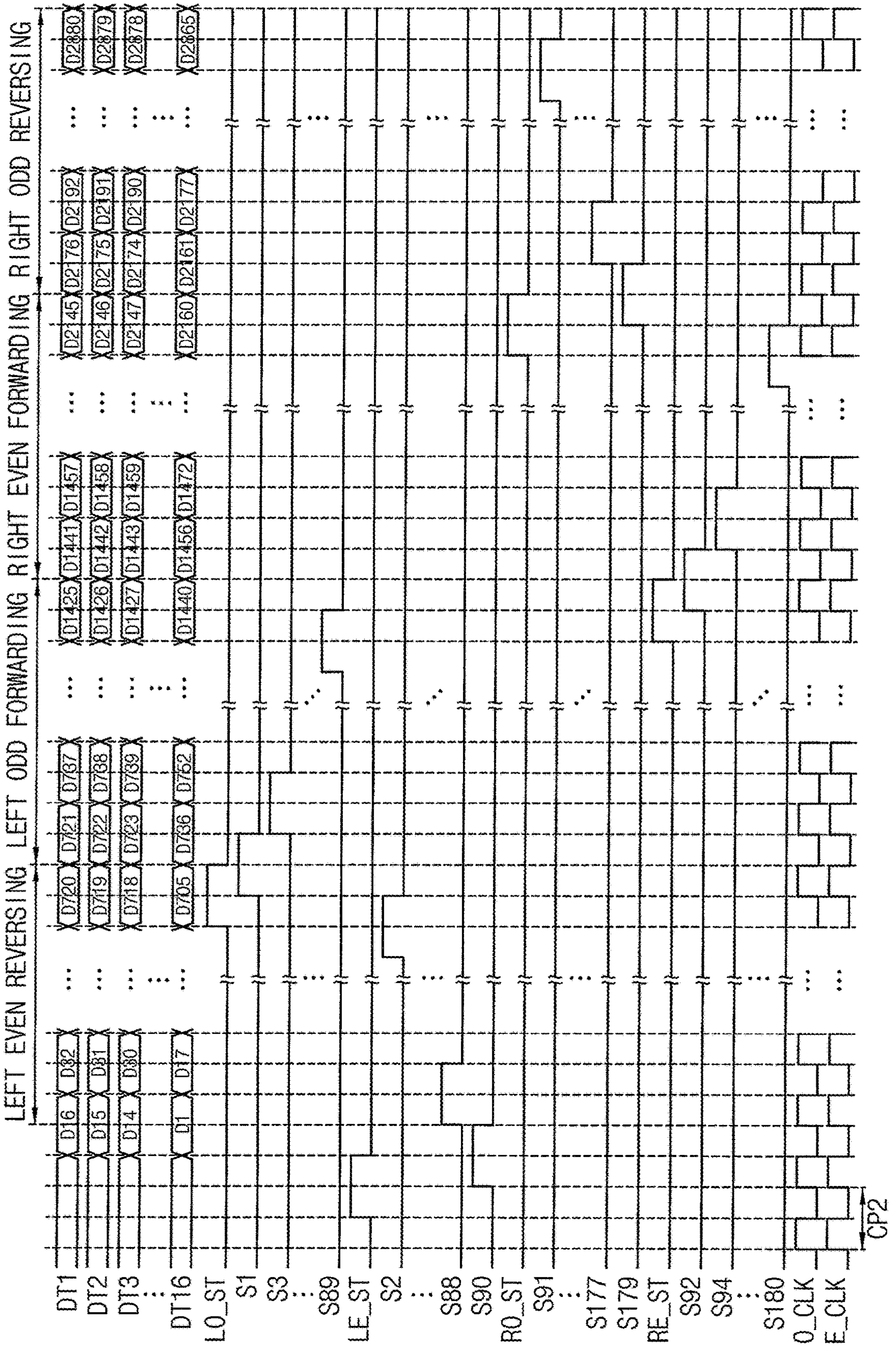
FIG. 11 is a timing diagram for describing an example of an operation of a data driver of FIG. 9 coupled to a dead space reduced display panel.

FIG. 9 is a block diagram for describing another example of a data driver coupled to a dead space reduced display panel, FIG. 10 is a block diagram for describing an example of data voltages output from a data driver of FIG. 9 coupled to a dead space reduced display panel, and FIG. 11 is a timing diagram for describing an example of an operation of a data driver of FIG. 9 coupled to a dead space reduced display panel.

Referring to FIGS. 9 through 11, a data driver 100*c* may be connected to a dead space reduced display panel 200*c*. The data driver 100*c* and the dead space reduced display panel 200*c* illustrated in FIGS. 9 through 11 may have similar configurations and similar operations to those of a data driver 100*b* and a dead space reduced display panel 200*b* illustrated in FIGS. 6 through 8, except that 1441th through 2160th data lines DL1441 through DL2160 may be directly connected to right even output terminals O1442, O1444, . . . , O2880, and 2161st through 2880th data lines DL2161 through DL2880 may be connected to right odd output terminals O2879, . . . , O1443 and O1441 through 2161st through 2880th auxiliary lines AL2161*c* through AL2880*c*, respectively.

A display region of the dead space reduced display panel 200*c* may be divided into a left region (corresponding to a first quarter of the display region), a left center region (corresponding to a second quarter of the display region), a right center region (corresponding to a third quarter of the display region) and a right region (corresponding to a fourth quarter of the display region). The dead space reduced display panel 200*c* may include data lines DL1 through DL2880, first auxiliary lines AL1 through AL720 connected to the data lines DL1 through DL720 located in the left region, and second auxiliary lines AL2161*c* through AL2880*c* connected to the data lines DL2161 through DL2880 located in the right region. The data lines DL721 through DL1440 located in the left center region may be directly connected to left odd output terminals O1, O3, . . . , O1439 of output terminals O1 through O2880, and the data lines DL1441 through DL2160 located in the right center region may be directly connected to right even output terminals O1442, O1444, . . . , O2880 of the output terminals O1 through O2880. The data lines DL1 through DL720 located in the left region may be connected to left even output terminals O1440, O1438, . . . , O2 of the output terminals O1 through O2880 through the first auxiliary lines AL1 through AL720, respectively. The data lines DL2161 through DL2880 located in the right region may be connected to right even output terminals O2879, . . . , O1443 and O1441 of the output terminals O1 through O2880 through the second auxiliary lines AL2161*c* through AL2880*c*, respectively. Accordingly, a dead space DS2 between the data driver 100*c* and the display region of the dead space reduced display panel 200*c* may be reduced compared with a dead space of a normal display panel.

In some embodiments, the data driver 100*c* may include first through (4N)-th output terminals O1 through O2880, where N is an integer greater than 0 (e.g., 720). The dead space reduced display panel 200*c* may include first through (4N)-th data lines DL1 through DL2880, first through (N)-th auxiliary lines AL1 through AL720 connected to the first through (N)-th data lines DL1 through DL720, and (3N+1)-th through (4N)-th auxiliary lines AL2161*c* through AL2880*c* connected to the (3N+1)-th through (4N)-th data lines DL2161 through DL2880. A (K)-th data line (e.g., DL1) of the first through (N)-th data lines DL1 through DL720 may be connected to a (2N−2K+2)-th output terminal (e.g., O1440) through a (K)-th auxiliary line (e.g., AL1) of the firth through (N)-th auxiliary lines AL1 through AL720, where K is an integer greater than 0 and less than or equal to N. A (N+K)-th data line (e.g., DL721) of the (N+1)-th through (2N)-th data lines DL721 through DL1440 may be directly connected to a (2K−1)-th output terminal (e.g., O1), and a (2N+K)-th data line (e.g., DL1441) of the (2N+1)-th through (3N)-th data lines DL1441 through DL2160 may be directly connected to a (2N+2K)-th output terminal (e.g., O1442). A (3N+K)-th data line (e.g., DL2161) of the (3N+1)-th through (4N)-th data lines DL2161 through DL2880 may be connected to a (4N−2K+1)-th output terminal (e.g., O2879) through a (3N+K)-th auxiliary line (e.g., AL2161*c*) of the (3N+1)-th through (4N)-th auxiliary lines AL2161*c* through AL2880*c*. For example, as illustrated in FIG. 9, N may be 720, 1st through 720th data lines DL1 through DL720 may be connected to 1440th, 1438th, . . . , and 2nd output terminals O1440, O1438, . . . , O2 through 1st through 720th auxiliary lines AL1 through AL720, respectively. 721st through 1440th data lines DL721 through DL1440 may be directly connected to 1st, 3rd, . . . , and 1439th output terminals O1, O3, . . . , O1439, respectively, and 1441st through 2160th data lines DL1441 through DL2160 may be directly connected to 1442nd, 1444th, . . . , and 2880th output terminals O1442, O1444, . . . , O2880, respectively. 2161st through 2880th data lines DL2161 through DL2880 may be connected to 2879th, . . . , 1443rd and 1441st output terminals O2879, . . . , O1443 and O1441 through 2161st through 2880th auxiliary lines AL2161*c* through AL2880*c*, respectively.

As illustrated in FIGS. 9 and 10, data voltages VD1 through VD2880 of the data driver 100*c* connected to the dead space reduced display panel 200*c* may include first through (4N)-th data voltages VD1 through VD2880 for first through (4N)-th data lines DL1 through DL2880. The data driver 100*c* may output a (K)-th data voltage (e.g., VD1) of the first through (N)-th data voltages VD1 through VD720 at the (2N−2K+2)-th output terminal (e.g., O1440), and may output a (N+K)-th data voltage (e.g., VD721) of the (N+1)-th through (2N)-th data voltages VD721 through VD1440 at the (2K−1)-th output terminal (e.g., O1). The data driver 100*c* may also output a (2N+K)-th data (e.g., VD1441) voltage of the (2N+1)-th through (3N)-th data voltages VD1441 through VD2160 at the (2N+2K)-th output terminal (e.g., O1442), and may output a (3N+K)-th data voltage (e.g., VD2161) of the (3N+1)-th through (4N)-th data voltages VD2161 through VD2880 at the (4N−2K+1)-th output terminal (e.g., O2879). For example, as illustrated in FIGS. 9 and 10, N may be 720, and the data driver 100*c* may output 1st through 720th data voltages VD1 through VD720 at 1440th, 1438th, . . . , 4th and 2nd output terminals O1440, O1438, . . . , O4 and O2, respectively, and may output 721st through 1440th data voltages VD721 through VD1440 at 1st, 3rd, . . . , 1437th and 1439th output terminals O1, O3, . . . , O1437 and O1439, respectively. The data driver 100*c* may output 1441st through 2160th data voltages VD1441 through VD2160 at 1442nd, 1444th, . . . , 2878th and 2880th output terminals O1442, O1444, . . . , O2878 and O2880, respectively, and may output 2161st through 2880th data voltages VD2161 through VD2880 at 2879th, 2877th, . . . , 1443rd and 1441st output terminals O2879, O2877, . . . , O1443 and O1441, respectively. To output the data voltages VD1 through VD2880 in an order suitable for the dead space reduced display panel 200*c*, a shift register array block of the data driver 100*c* may generate sampling signals S1 through S180 in an order different from an order for the normal display panel. For example, the shift register array block may generate left even sampling signals S2, . . . , S90 in a reverse order, then may generate left odd sampling signals S1, . . . , S89 in a forward order, then may generate right even sampling signals S92, . . . , S180 in the forward order, and then may generate right odd sampling signals S91, . . . , S179 in the reverse order.

In some embodiments, as illustrated in FIG. 11, a left even shift register array may generate the left even sampling signals S2, . . . , S88 and S90 (e.g., 2nd, . . . , 88th and 90th sampling signals S2, . . . , S88 and S90) corresponding to the left even output terminals O2, O4, . . . , O1438 and O1440 (e.g., 2nd, 4th, . . . , 1438th and 1440th output terminals O2, O4, . . . , O1438 and O1440) in the reverse order. A left odd shift register array may generate the left odd sampling signals S1, S3, . . . , S89 (e.g., 1st, 3rd, . . . , and 89th sampling signals S1, S3, . . . , S89) corresponding to the left odd output terminals O1, O3, . . . , O1437 and O1439 (e.g., 1st, 3rd, . . . , 1437th and 1439th output terminals O1, O3, . . . , O1437 and O1439) in the forward order A right even shift register array may generate the right even sampling signals S92, S94, . . . , S180 (e.g., 92nd, 94th, . . . , and 180th sampling signals S92, S94, . . . , S180) corresponding to the right even output terminals O1442, O1444, . . . , O2878 and O2880 (e.g., 1442nd, 1444th, . . . , 2878th and 2880th output terminals O1442, O1444, . . . , O2878 and O2880) in the forward order. A right odd shift register array may generate the right odd sampling signals S91, . . . , S177 and S179 (e.g., 91st, . . . , 177th and 179th sampling signals S91, . . . , S177 and S179) corresponding to the right odd output terminals O1441, O1443, . . . , O2877 and O2879 (e.g., 1441st, 1443rd, . . . , 2877th and 2879th output terminals O1441, O1443, . . . , O2877 and O2879) in the reverse order.

In response to the 90th, 88th, . . . , and 2nd sampling signals S90, S88, . . . , S2 in the reverse order, the 1st, 3rd, . . . , and 89th sampling signals S1, S3, . . . , S89 in the forward order, the 92nd, 94th, . . . , and 180th sampling signals S92, S94, . . . , S180 in the forward order, and the 179th, 177th, . . . , and 91st sampling signals S179, S177, . . . , S91 in the reverse order, the data driver 100*c* may output the 1st through 720th data voltages VD1 through VD720 at the 1440, 1438, . . . , 4th and 2nd output terminals O1440, O1438, . . . , O4 and O2, may output the 721st through 1440th data voltages VD721 through VD1440 at the 1st, 3rd, . . . , 1437th and 1439th output terminals O1, O3, . . . , O1437 and O1439, may output the 1441st through 2160th data voltages VD1441 through VD2160 at the 1442nd, 1444th, . . . , 2878th and 2880th output terminals O1442, O1444, . . . , O2878 and O2880, and may output the 2161st through 2880th data voltages VD2161 through VD2880 at the 2879th, 2877th, . . . , 1443rd and 1441st output terminals O2879, O2877, . . . , O1443 and O1441. Thus, the data driver 100*c* may output the data voltages VD1 through VD2880 in the order suitable for the dead space reduced display panel 200*c*.

Figure 12:
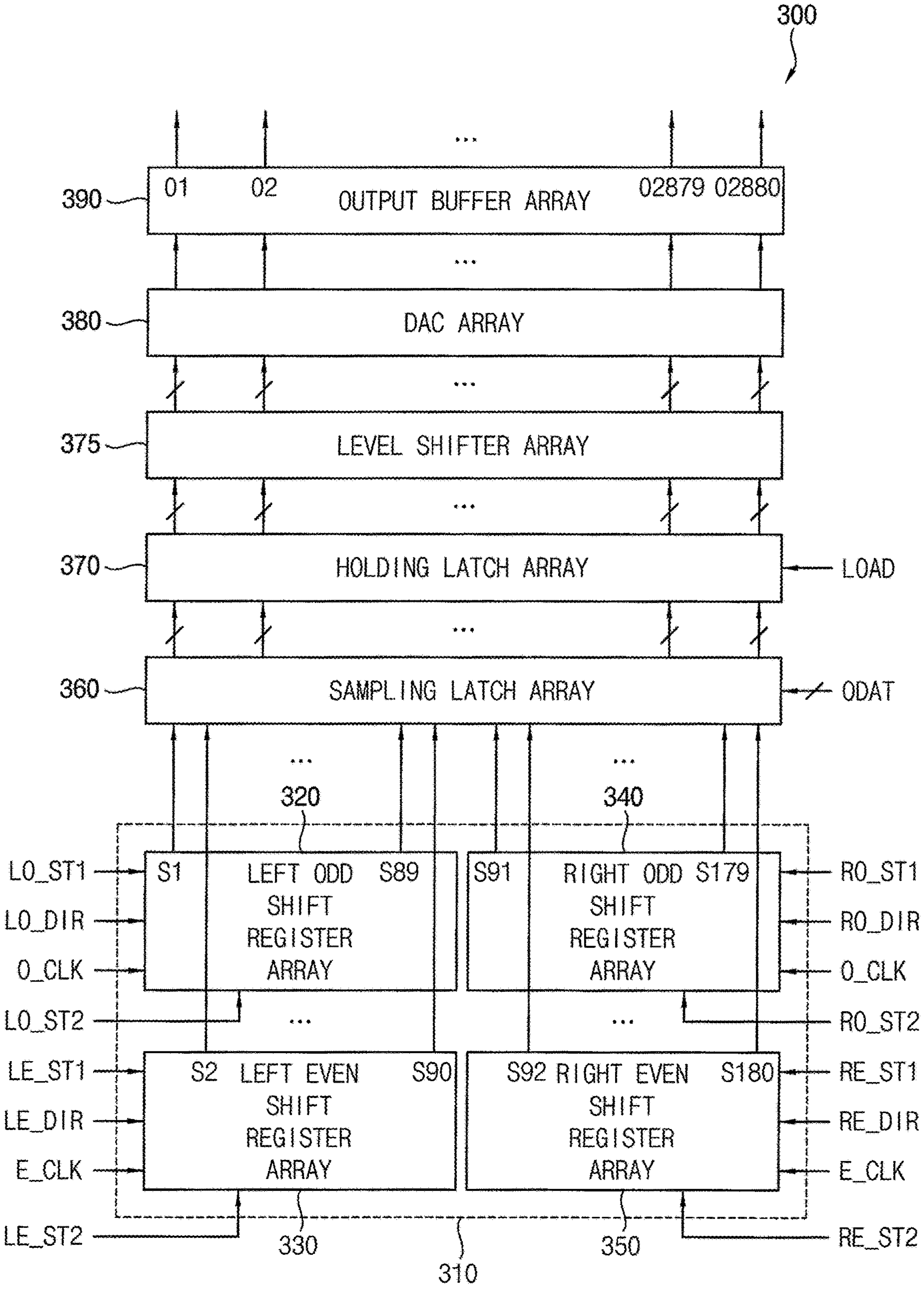
FIG. 12 is a block diagram illustrating a data driver according to embodiments.
Figure 13:
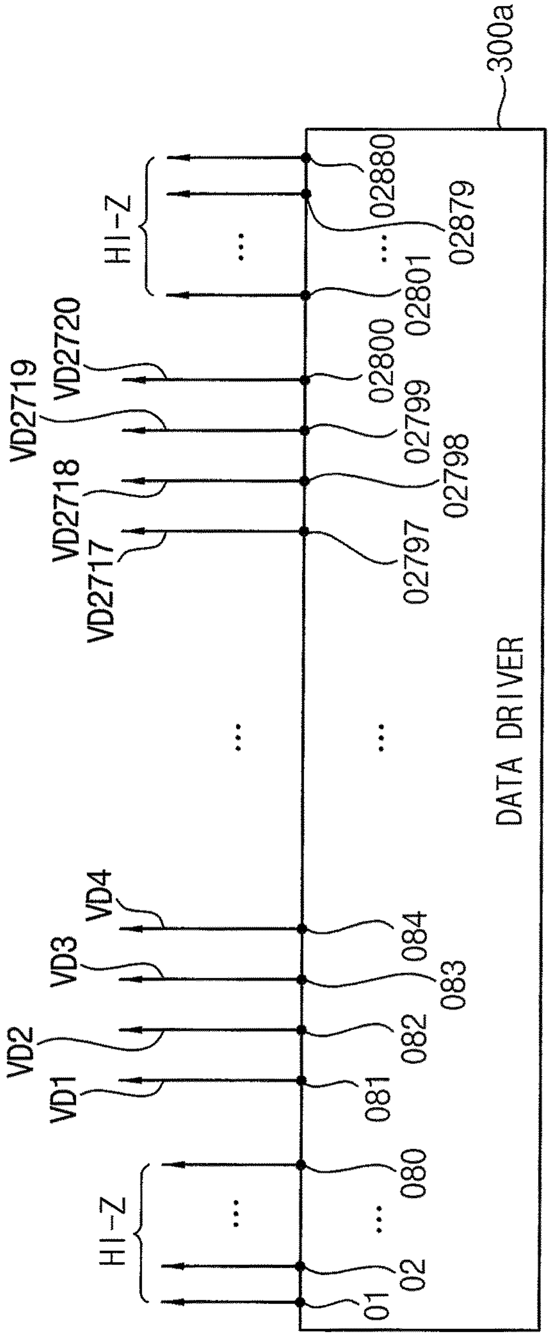
FIG. 13 is a block diagram for describing an example of data voltages output from a data driver coupled to a normal display panel.
Figure 14:
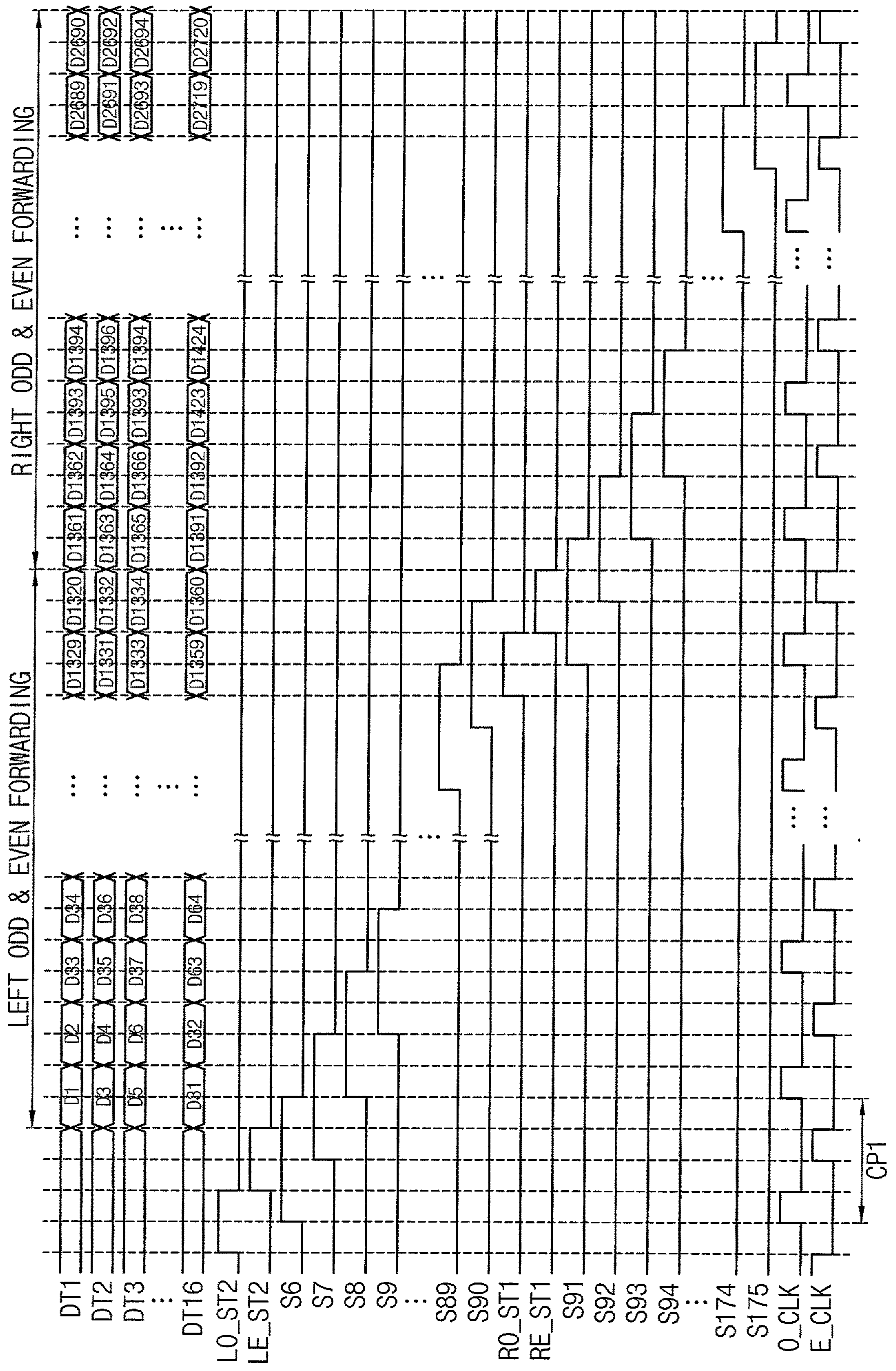
FIG. 14 is a timing diagram for describing an example of an operation of a data driver coupled to a normal display panel.
Figure 15:
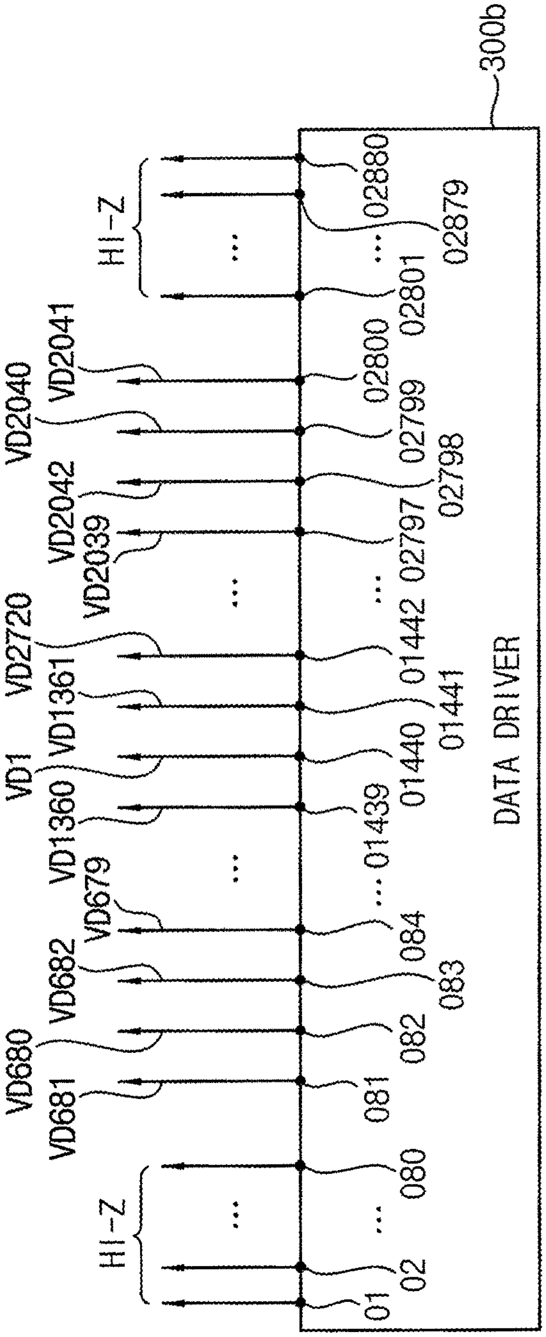
FIG. 15 is a block diagram for describing an example of data voltages output from a data driver coupled to a dead space reduced display panel.
Figure 16:
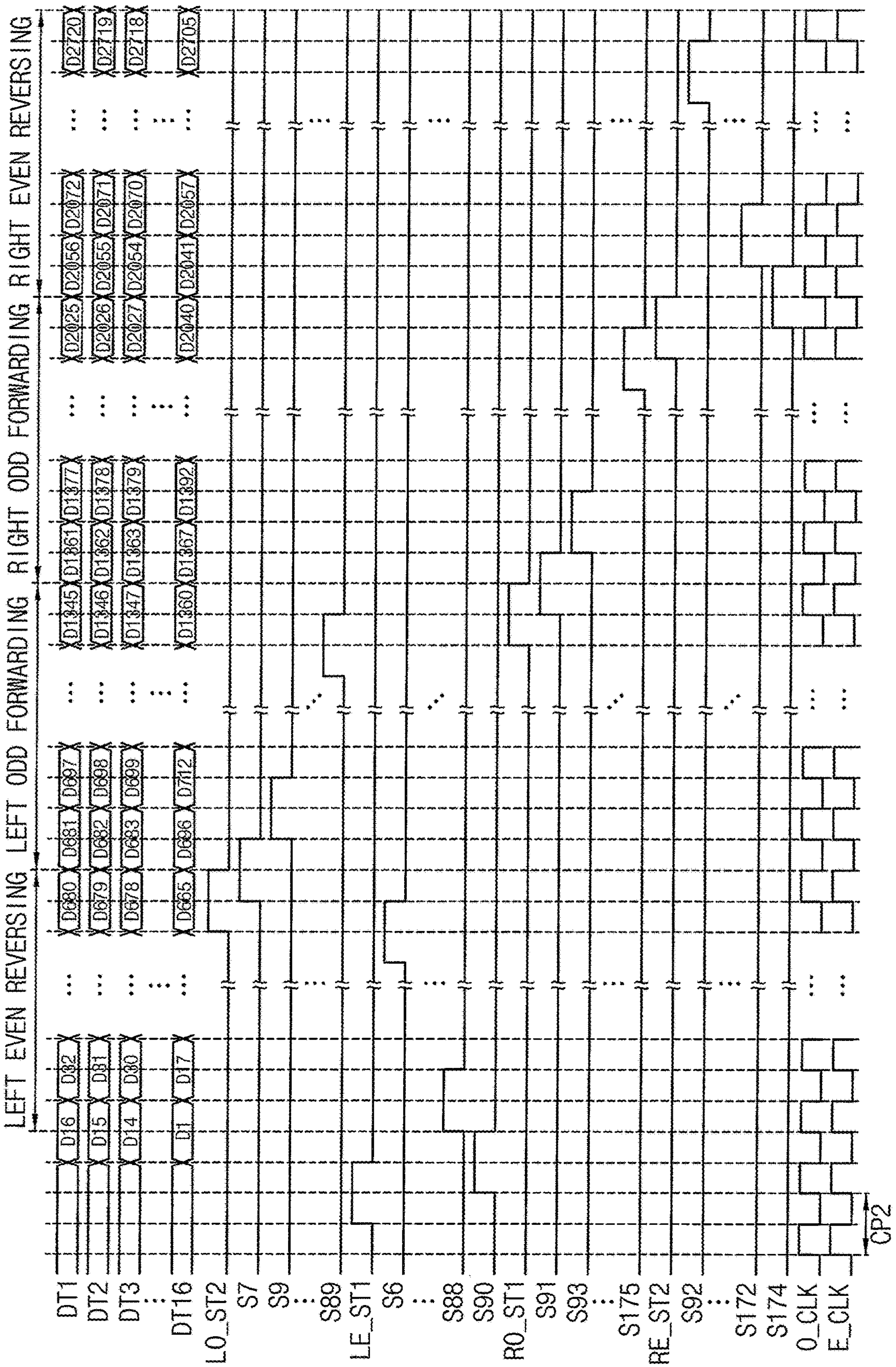
FIG. 16 is a timing diagram for describing an example of an operation of a data driver coupled to a dead space reduced display panel.
Figure 17:
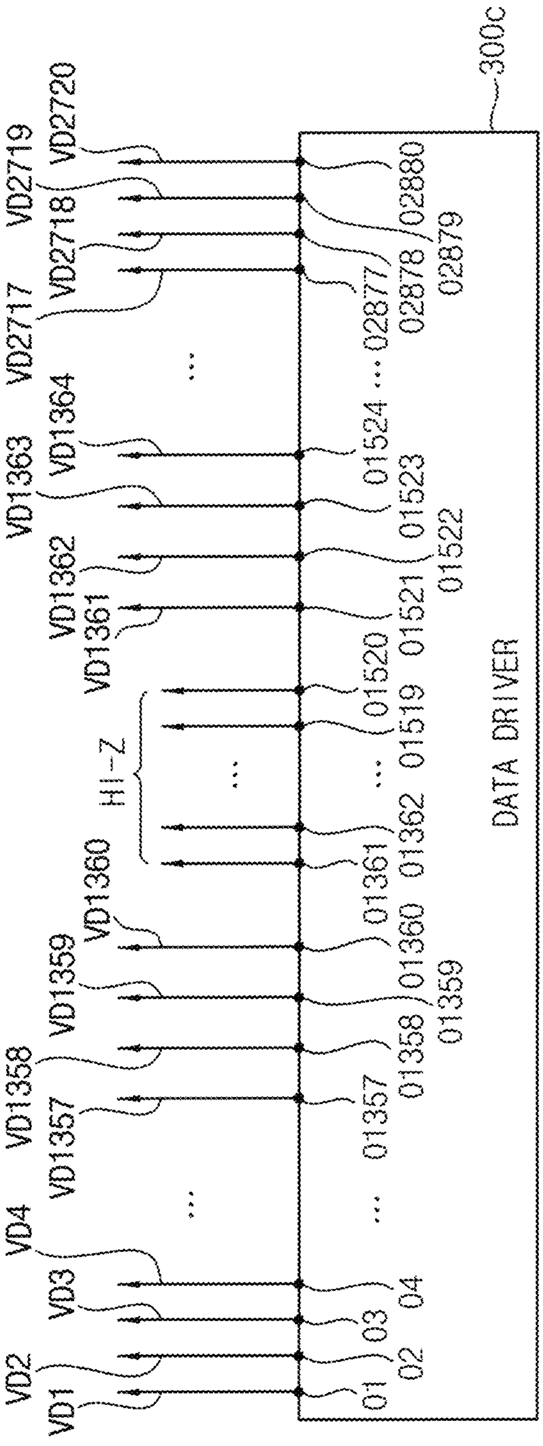
FIG. 17 is a block diagram for describing another example of data voltages output from a data driver coupled to a normal display panel.
Figure 18:
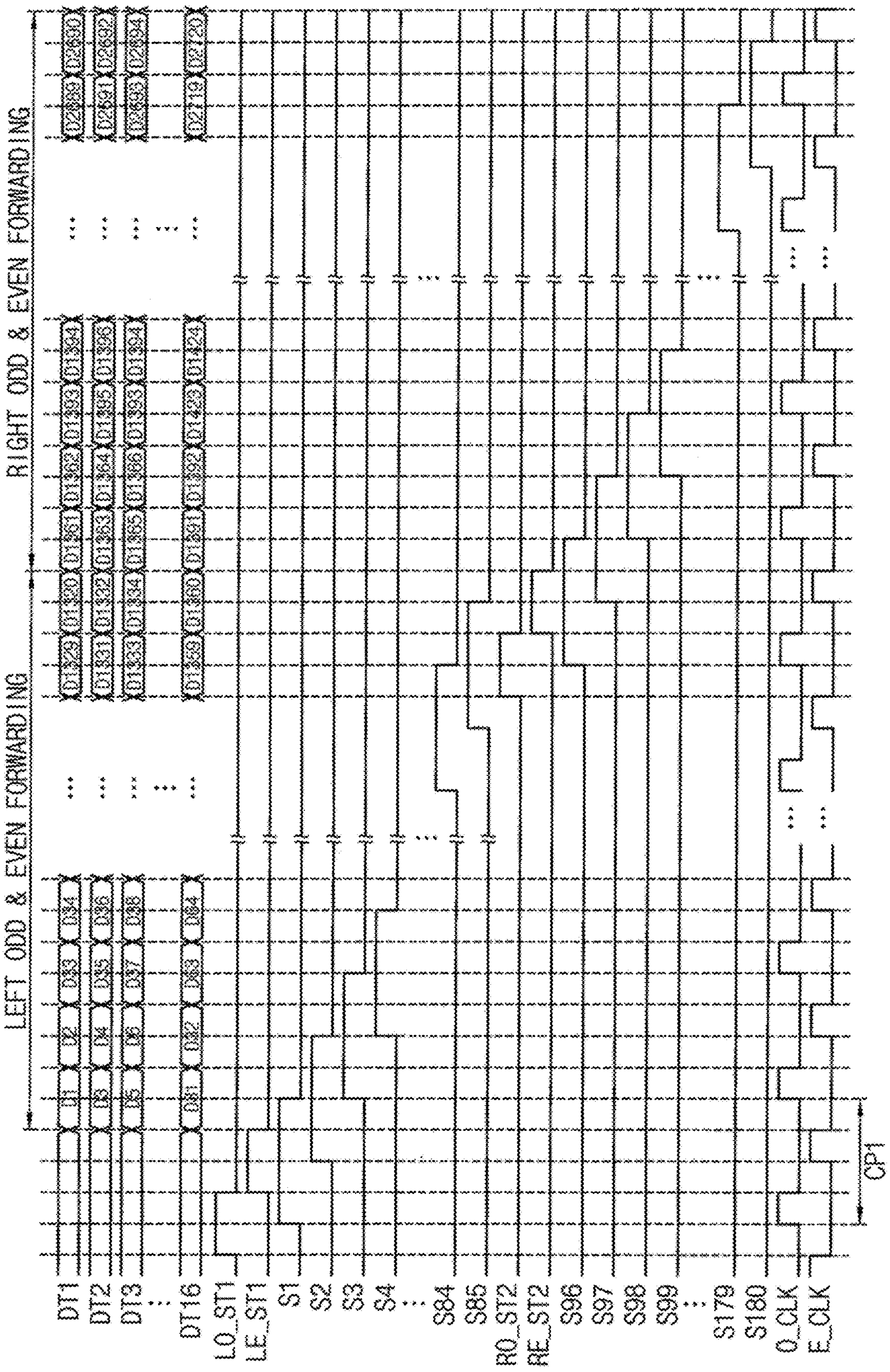
FIG. 18 is a timing diagram for describing another example of an operation of a data driver coupled to a normal display panel.
Figure 19:
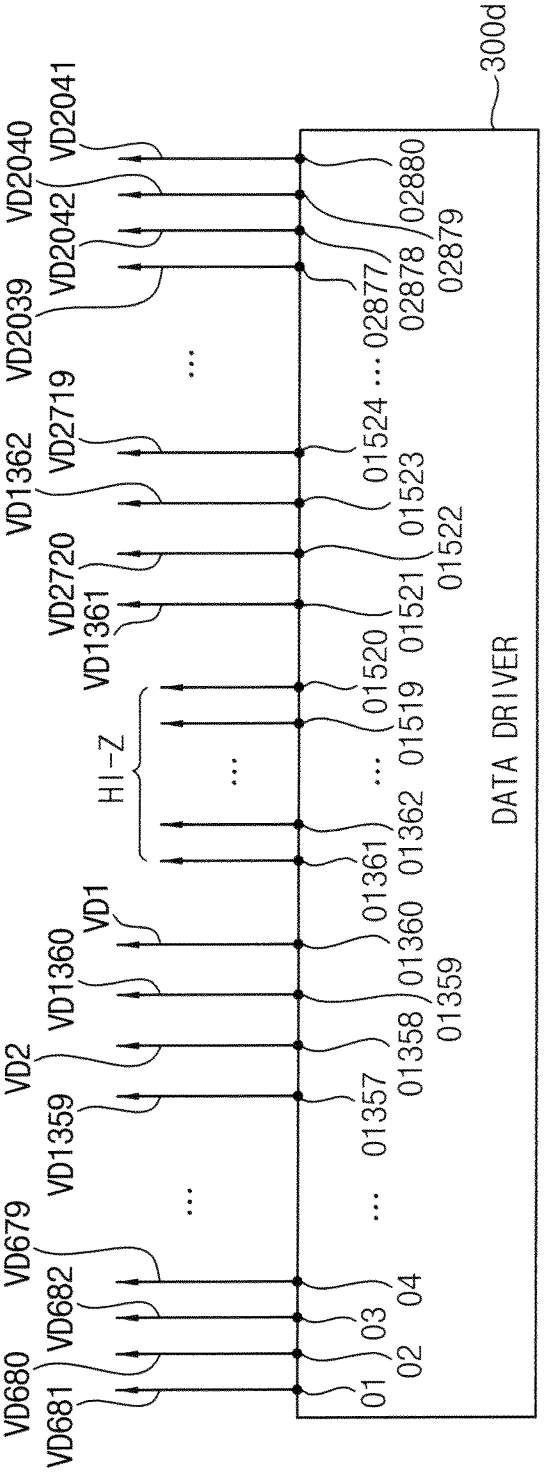
FIG. 19 is a block diagram for describing another example of data voltages output from a data driver coupled to a dead space reduced display panel.
Figure 20:
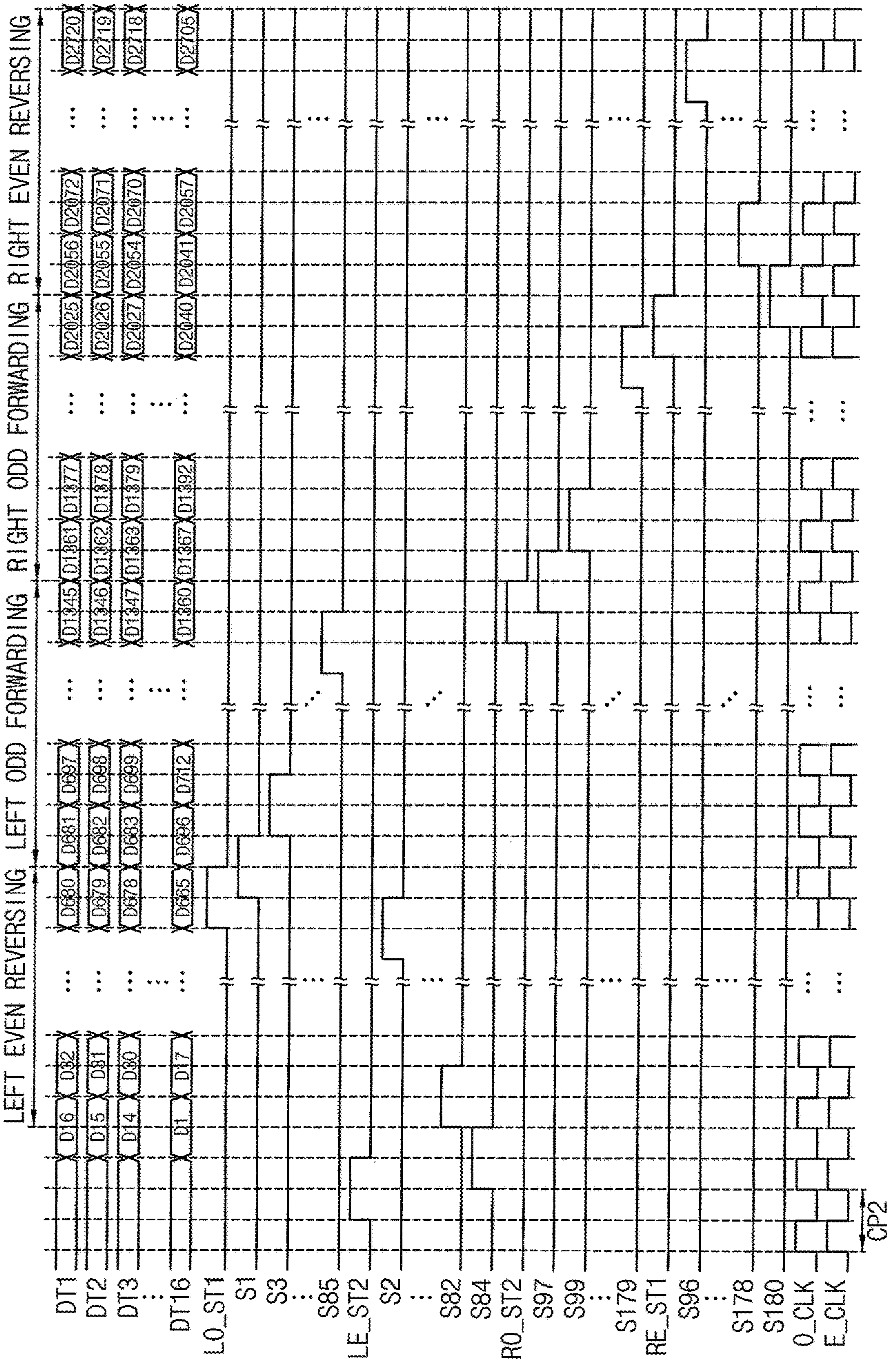
FIG. 20 is a timing diagram for describing another example of an operation of a data driver coupled to a dead space reduced display panel.

FIG. 12 is a block diagram illustrating a data driver according to embodiments, FIG. 13 is a block diagram for describing an example of data voltages output from a data driver coupled to a normal display panel, FIG. 14 is a timing diagram for describing an example of an operation of a data driver coupled to a normal display panel, FIG. 15 is a block diagram for describing an example of data voltages output from a data driver coupled to a dead space reduced display panel, FIG. 16 is a timing diagram for describing an example of an operation of a data driver coupled to a dead space reduced display panel, FIG. 17 is a block diagram for describing another example of data voltages output from a data driver coupled to a normal display panel, FIG. 18 is a timing diagram for describing another example of an operation of a data driver coupled to a normal display panel, FIG. 19 is a block diagram for describing another example of data voltages output from a data driver coupled to a dead space reduced display panel, and FIG. 20 is a timing diagram for describing another example of an operation of a data driver coupled to a dead space reduced display panel.

Referring to FIG. 12, a data driver 300 providing data voltages to a display panel according to embodiments may include a shift register array block 310, a sampling latch array 360, a holding latch array 370, a level shifter array 375, a DAC array 380 and an output buffer array 390. The shift register array block 310 may include a left odd shift register array 320, a left even shift register array 330, a right odd shift register array 340 and a right even shift register array 350. The data driver 300 of FIG. 12 may have a similar configuration and a similar operation to those of a data driver 100 of FIG. 1, except that the left odd shift register array 320 may further receive a left odd middle start signal LO_ST2, the left even shift register array 330 may further receive a left even middle start signal LE_ST2, the right odd shift register array 340 may further receive a right odd middle start signal RO_ST2, and the right even shift register array 350 may further receive a right even middle start signal RE_ST2.

The left odd shift register array 320 may sequentially generate left odd sampling signals S1, . . . , S89 in a forward order or a reverse order in response to a left odd start signal LO_ST1, and the left even shift register array 330 may sequentially generate left even sampling signals S2, . . . , S90 in the forward order or the reverse order in response to a left even start signal LE_ST1. The right odd shift register array 340 may sequentially generate right odd sampling signals S91, . . . , S179 in the forward order or the reverse order in response to a right odd start signal RO_ST1, and the right even shift register array 350 may sequentially generate right even sampling signals S92, . . . , S180 in the forward order or the reverse order in response to a right even start signal RE_ST1.

In a case where the left odd shift register array 320 receives the left odd middle start signal LO_ST2 instead of the left odd start signal LO_ST1, the left odd shift register array 320 may sequentially generate a portion of the left odd sampling signals S1, . . . , S89 from a middle left odd sampling signal to the last left odd sampling signal S89 in response to a left odd direction signal LO_DIR indicating a forward direction, and may sequentially generate the remaining portion of the left odd sampling signals S1, . . . , S89 from an odd sampling signal just preceding the middle left odd sampling signal to a first left odd sampling signal S1 in response to the left odd direction signal LO_DIR indicating a reverse direction. In a case where the left even shift register array 330 receives the left even middle start signal LE_ST2 instead of the left even start signal LE_ST1, the left even shift register array 330 may sequentially generate a portion of the left even sampling signals S2, . . . , S90 from a middle left even sampling signal to the last left even sampling signal S90 in response to a left even direction signal LE_DIR indicating the forward direction, and may sequentially generate the remaining portion of the left even sampling signals S2, . . . , S90 from an even sampling signal just preceding the middle left even sampling signal to a first left even sampling signal S2 in response to the left even direction signal LE_DIR indicating the reverse direction. In a case where the right odd shift register array 340 receives the right odd middle start signal RO_ST2 instead of the right odd start signal RO_ST1, the right odd shift register array 340 may sequentially generate a portion of the right odd sampling signals S91, . . . , S179 from a middle right odd sampling signal to the last right odd sampling signal S179 in response to a right odd direction signal RO_DIR indicating the forward direction, and may sequentially generate the remaining portion of the right odd sampling signals S91, . . . , S179 from an odd sampling signal just preceding the middle right odd sampling signal to a first right odd sampling signal S91 in response to the right odd direction signal RO_DIR indicating the reverse direction. Further, in a case where the right even shift register array 350 receives the right even middle start signal RE_ST2 instead of the right even start signal RE_ST1, the right even shift register array 350 may sequentially generate a portion of the right even sampling signals S92, . . . , S180 from a middle right even sampling signal to the last right even sampling signal S180 in response to a right even direction signal RE_DIR indicating the forward direction, and may sequentially generate the remaining portion of the right even sampling signals S92, . . . , S180 from an even sampling signal just preceding the middle right even sampling signal to a first right even sampling signal S92 in response to the right even direction signal RE_DIR indicating the reverse direction.

In some embodiments, as illustrated in FIG. 13, the data driver 300*a* may be connected to a normal display panel including data lines where the number (e.g., 2720) of the data lines is less than the number (e.g., 2880) of output terminals O1 through O2880. Outer output terminals O1 through O80 and O2801 through O2880 of the output terminals O1 through O2880 of the data driver 300*a* may not be connected to the data lines of the normal display panel, and center output terminals O81 through O2800 of the output terminals O1 through O2880 may be sequentially connected to the data lines of the normal display panel. In some embodiments, the outer output terminals O1 through O80 and O2801 through O2880 may be in a high-impedance ("HI-Z") state.

To output the data voltages VD1 through VD2720 at the center output terminals O81 through O2800, as illustrated in FIG. 14, the left odd and left even shift register arrays 320 and 330 may sequentially generate a portion of left sampling signals S1 through S90, or 6th through 90th sampling signals S6 through S90 in response to the left odd middle start signal LO_ST2 and the left even middle start signal LE_ST2, and the right odd and right even shift register arrays 340 and 350 may sequentially generate right sampling signals S91 through S172 in response to the right odd start signal RO_ST1 and the right even start signal RE_ST1. Accordingly, the data driver 300*a* may output 1st through 2720th data voltages VD1 through VD2720 in an order suitable for the normal display panel at the center output terminals O81 through O2800. Even if 176th through 180th sampling signals are generated, since the outer output terminals O2801 through O2880 corresponding to the 176th through 180th sampling signals are in the HI-Z state, the 176th through 180th sampling signals can be ignored.

In other embodiments, as illustrated in FIG. 15, the data driver 300*b* may be connected to a dead space reduced display panel including data lines and auxiliary lines where the number (e.g., 2720) of the data lines is less than the number (e.g., 2880) of output terminals O1 through O2880. Outer output terminals O1 through O80 and O2801 through O2880 of the output terminals O1 through O2880 of the data driver 300*b* may not be connected to the data lines of the dead space reduced display panel, and may be in the HI-Z state. Center output terminals O81 through O2800 of the output terminals O1 through O2880 of the data driver 300*b* may be connected to the data lines or the auxiliary lines.

To output the data voltages VD1 through VD2720 at the center output terminals O81 through O2800, as illustrated in FIG. 16, the left even shift register array 330 may generate the left even sampling signals S90, S88, . . . , S6 in the reverse order in response to the left even start signal LE_ST1, and the left odd shift register array 320 may generate a portion of the left odd sampling signals S1, . . . , S89, or 7th, 9th, . . . , and 89th sampling signals S7, S9, . . . , S89 in the forward order in response to the left odd middle start signal LO_ST2. The right odd shift register array 340 may generate the right odd sampling signals S91, S93, . . . , S175 in the forward order in response to the right odd start signal RO_ST1, and the right even shift register array 350 may generate a portion of the right even sampling signals S92, . . . , S180, or 174th, 172nd, . . . , and 92nd sampling signals S174, S172, . . . , S92 in the reverse order in response to the right even middle start signal RE_ST2. Accordingly, the data driver 300*b* may output 1st through 680th data voltages VD1 through VD680 at 1440th, . . . , 84th and 82nd output terminals O1440, . . . , O84 and O82, respectively, may output 681th through 2040 data voltages VD681, VD682, . . . , VD1360, VD1361, . . . , VD2039 and VD2040 at 81st, 83rd, . . . , 1439th, 1441st, . . . , 2797th and 2799th output terminals O81, O83, . . . , O1439, O1441, . . . , O2797 and O2799, respectively, and may output 2041st through 2720th data voltages VD2041 through VD2720 at 2800th, 2798th, . . . , and 1442nd output terminals O2800, O2798, . . . , O1442, respectively. Accordingly, the data driver 300*b* may output the 1st through 2720th data voltages VD1 through VD2720 in an order suitable for the dead space reduced display panel at the center output terminals O81 through O2800.

In still other embodiments, as illustrated in FIG. 17, the data driver 300*c* may be connected to a normal display panel including data lines where the number (e.g., 2720) of the data lines is less than the number (e.g., 2880) of output terminals O1 through O2880. Center output terminals O1361 through O1520 of the output terminals O1 through O2880 of the data driver 300*c* may not be connected to the data lines of the normal display panel, and may be in the HI-Z state. Outer output terminals O1 through O1360 and O1521 through O2880 of the output terminals O1 through O2880 of the data driver 300*c* may be sequentially connected to the data lines of the normal display panel.

To output the data voltages VD1 through VD2720 at the outer output terminals O1 through O1360 and O1521 through O2880, respectively, as illustrated in FIG. 18, the left odd and left even shift register arrays 320 and 330 may sequentially generate left sampling signals S1 through S85 in response to the left odd start signal LO_ST1 and the left even start signal LE_ST1, and the right odd and right even shift register arrays 340 and 350 may sequentially generate a portion of right sampling signals S91 through S180, or 96th through 180th sampling signals S96 through S180 in response to the right odd middle start signal RO_ST2 and the right even middle start signal RE_ST2. Accordingly, the data driver 300*c* may output 1st through 2720th data voltages VD1 through VD2720 in an order suitable for the normal display panel at the outer output terminals O1 through O1360 and O1521 through O2880.

In still other embodiments, as illustrated in FIG. 19, the data driver 300*d* may be connected to a dead space reduced display panel including data lines and auxiliary lines where the number (e.g., 2720) of the data lines is less than the number (e.g., 2880) of output terminals O1 through O2880. Center output terminals O1361 through O1520 of the output terminals O1 through O2880 of the data driver 300*d* may not be connected to the data lines of the dead space reduced display panel, and may be in the HI-Z state. Outer output terminals O1 through O1360 and O1521 through O2880 of the output terminals O1 through O2880 of the data driver 300*d* may be sequentially connected to the data lines of the dead space reduced display panel.

To output the data voltages VD1 through VD2720 at the outer output terminals O1 through O1360 and O1521 through O2880, as illustrated in FIG. 20, the left even shift register array 330 may generate a portion of the left even sampling signals S90, . . . , S2, or 84th, 82th, . . . , and 2nd sampling signals S84, S82, . . . , S2 in the reverse order in response to the left even middle start signal LE_ST2, and the left odd shift register array 320 may generate the left odd sampling signals S1, S3, . . . , S85 in the forward order in response to the left odd start signal LO_ST1. In addition, the right odd shift register array 340 may generate a portion of the right odd sampling signals S91, . . . , S179, or 97th, 99th, . . . , and 179th sampling signals S97, S99, . . . , S179 in the forward order in response to the right odd middle start signal RO_ST2, and the right even shift register array 350 may generate the right even sampling signals S180, S178, . . . , S96 in the reverse order in response to the right even start signal RE_ST1. Accordingly, the data driver 300*d* may output 1st through 680th data voltages VD1 through VD680 at 1360th, 1358th, . . . , 4th, and 2nd output terminals O1360, O1358, . . . , O4 and O2, may output 681st through 1360th data voltages VD681, VD682, . . . , VD1359 and VD1360 at 1st, 3rd, . . . , 1357th and 1359th output terminals O1, O3, . . . , O1357 and O1359, may output 1361st through 2040th data voltages VD1361, VD1362, . . . , VD2039 and VD2040 at 1521st, 1523rd, . . . , 2877th and 2879th output terminals O1521, O1523, . . . , O2877 and O2879, and may output 2041st through 2720th data voltages VD2041 through VD2720 at 2880th, 2878th, . . . , 1524th and 1522nd output terminals O2880, O2878, . . . , O1524 and O1522. Accordingly, the data driver 300*d* may output the 1st through 2720th data voltages VD1 through VD2720 in an order suitable for the dead space reduced display panel at the outer output terminals O1 through O1360 and O1521 through O2880.

As described above, the data driver 300 according to embodiments may output the data voltages VD1 through VD2720 in the order suitable for the normal display panel where the number (e.g., 2720) of data lines is less than the number of the output terminals O1 through O2880, or may output the data voltages VD1 through VD2720 in the order suitable for the dead space reduced display panel where the number (e.g., 2720) of data lines is less than the number of the output terminals O1 through O2880.

Figure 21:
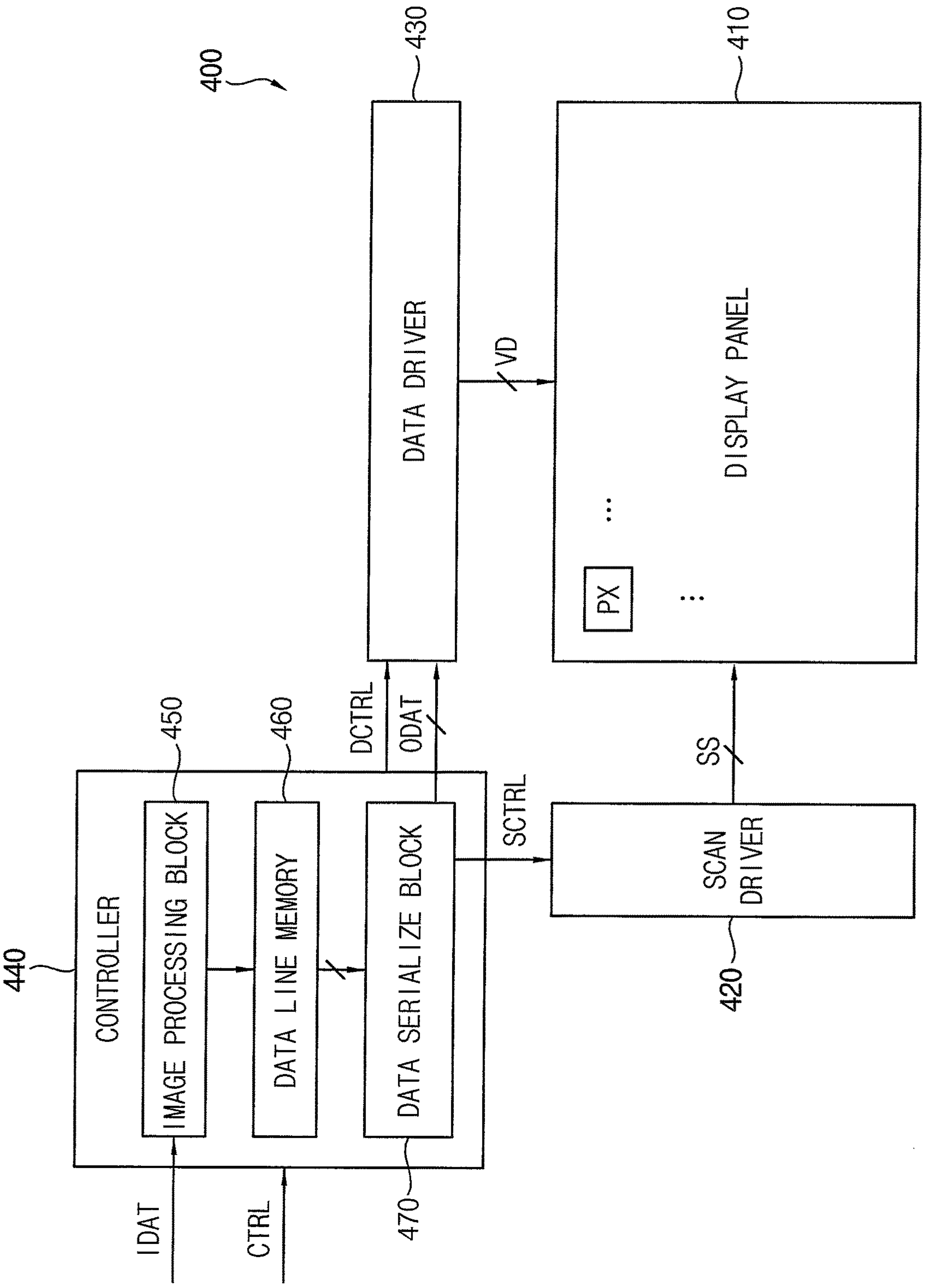
FIG. 21 is a block diagram illustrating a display device including a data driver according to embodiments.
Figure 22:
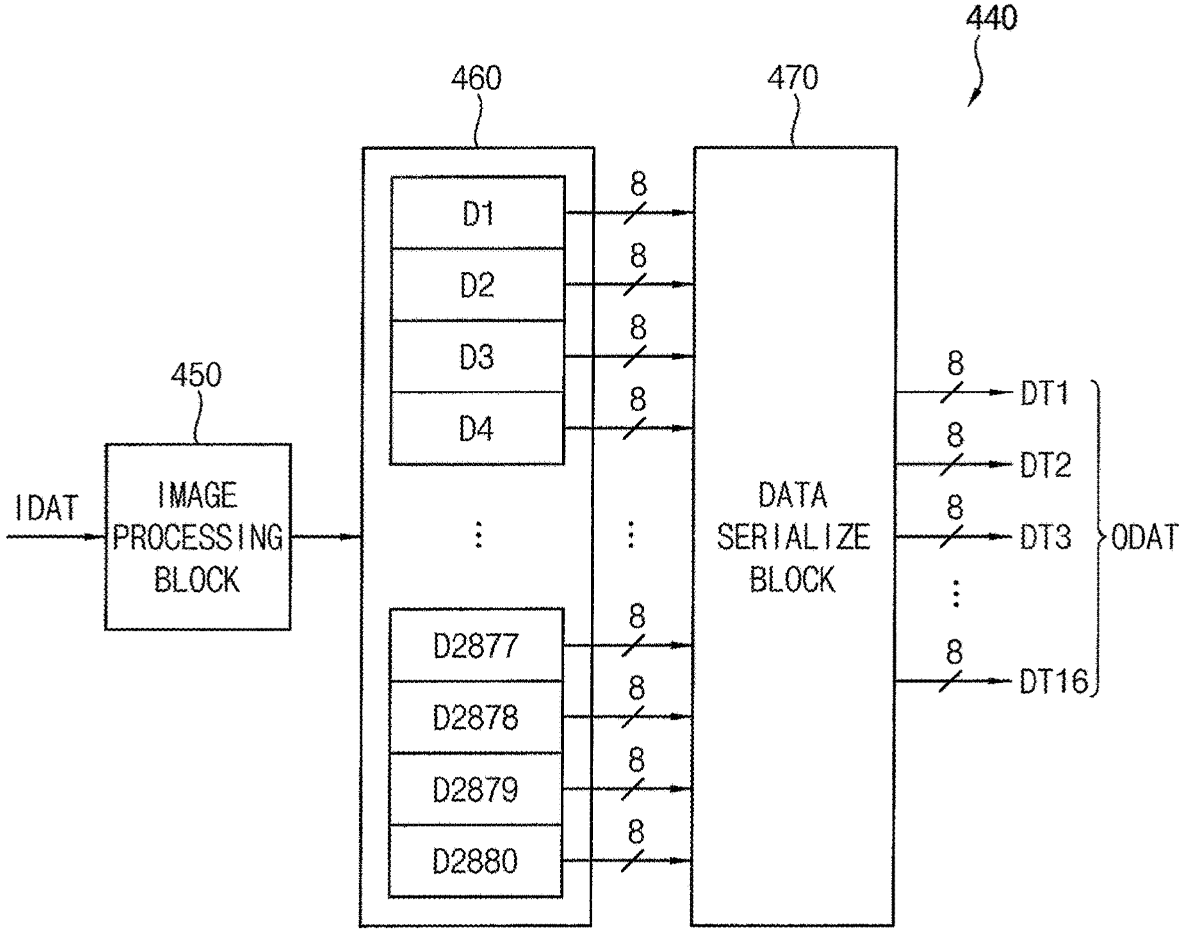
FIG. 22 is a block diagram illustrating an example of a controller included in a display device of FIG. 21.

FIG. 21 is a block diagram illustrating a display device including a data driver according to embodiments, and FIG. 22 is a block diagram illustrating an example of a controller included in a display device of FIG. 21.

Referring to FIG. 21, a display device 400 according to embodiments may include a display panel 410, a scan driver 420 that provides scan signals SS to the display panel 410, a data driver 430 that provides data voltages VD to the display panel 410, and a controller 440 that controls the scan driver 420 and the data driver 430.

The display panel 410 may include a plurality of scan lines, a plurality of data lines, and a plurality of pixels PX coupled to the plurality of scan lines and the plurality of data lines. In some embodiments, each pixel PX may include at least two transistors, at least one capacitor, and an organic light emitting diode ("OLED"), and the display panel 410 may be an OLED display panel. In other embodiments, each pixel PX may include a switching transistor, and a liquid crystal capacitor coupled to the switching transistor, and the display panel 410 may be a liquid crystal display ("LCD") panel. However, the display panel 410 may not be limited to the OLED panel and the LCD panel, and may be any suitable display panel.

The scan driver 420 may generate the scan signals SS based on a scan control signal SCTRL received from the controller 440, and may sequentially provide the scan signals SS to the plurality of pixels PX on a row-by-row basis through the plurality of scan lines. In some embodiments, the scan control signal SCTRL may include, but not limited to, a scan start signal, a scan clock signal, etc. In some embodiments, the scan driver 420 may be integrated or formed in a peripheral portion of the display panel 410. In other embodiments, the scan driver 420 may be implemented in a form of an integrated circuit.

The data driver 430 may generate the data voltages VD based on output image data ODAT and a data control signal DCTRL received from the controller 440, and may provide the data voltages VD to the plurality of pixels PX through the plurality of data lines. In some embodiments, the data control signal DCTRL may include, but not limited to, left odd, left even, right odd and right even start signals, left odd, left even, right odd and right even direction signals, and/or odd and even clock signals. In some embodiments, the data control signal DCTRL may further include left odd, left even, right odd and right even middle start signals. According to embodiments, the data driver 430 may be a data driver 100 of FIG. 1 or a data driver 300 of FIG. 12. Accordingly, the data driver 430 may output the data voltages VD in an order suitable for a normal display panel in a case where the display panel 410 is the normal display panel, and may output the data voltages VD in an order suitable for a dead space reduced display panel in a case where the display panel 410 is the dead space reduced display panel.

The controller 440 (e.g., a timing controller ("TCON")) may receive input image data IDAT and a control signal CTRL from an external host (e.g., a graphic processing unit ("GPU"), a graphic card, etc.). For example, the input image data IDAT may be, but not limited to, an RGB image data including red (R) image data, green (G) image data and blue (B) image data. Further, for example, the control signal SCTRL may include, but not limited to, a data enable signal, a master clock signal, etc. The controller 440 may generate the output image data ODAT, the data control signal DCTRL and the scan control signal SCTRL based on the input image data IDAT and the control signal CTRL. The controller 440 may control an operation of the scan driver 420 by providing the scan control signal SCTRL to the scan driver 420, and may control an operation of the data driver 430 by providing the output image data ODAT and the data control signal DCTRL to the data driver 430.

In some embodiments, as illustrated in FIGS. 21 and 22, the controller 440 may include an image processing block 450, a data line memory 460 and a data serialize block 470. The image processing block 450 may perform image processing on the input image data IDAT. Ins some embodiments, the image processing performed by the image processing block 450 may include, but not limited to, a gamma compensation tuning process, a skin color correction process, an image enhancement process, etc. The data line memory 460 may store the input image data IDAT for one pixel row of the display panel 410, for example, 1st through 2880th pixel data D1 through D2880. The data serialize block 470 may generate the output image data ODAT provided to the data driver 430 by rearranging the input image data IDAT, or the 1st through 2880th pixel data D1 through D2880 stored in the data line memory 460. In some embodiments, the data serialize block 470 may substantially simultaneously transfer sixteen pixel data included in the output image data ODAT to the data driver 430 through sixteen data transfer line sets DT1, DT2, DT3, . . . , DT16. According to embodiments, the data serialize block 470 may provide the output image data ODAT to the data driver 430 as illustrated in FIG. 5, FIG. 8, FIG. 11, FIG. 14, FIG. 16, FIG. 18 or FIG. 20.

Figure 23:
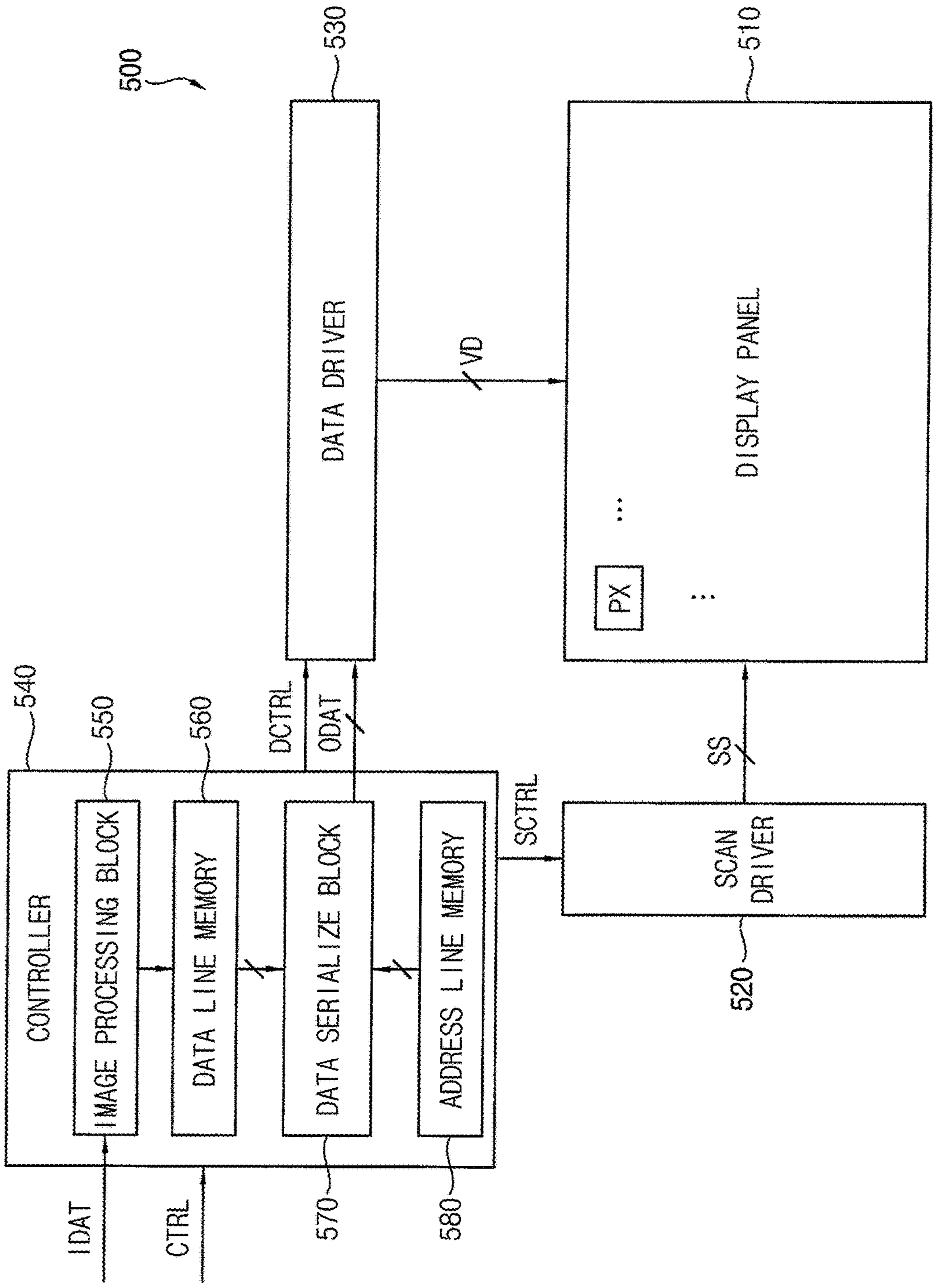
FIG. 23 is a block diagram illustrating a display device including a data driver according to embodiments.
Figure 24:
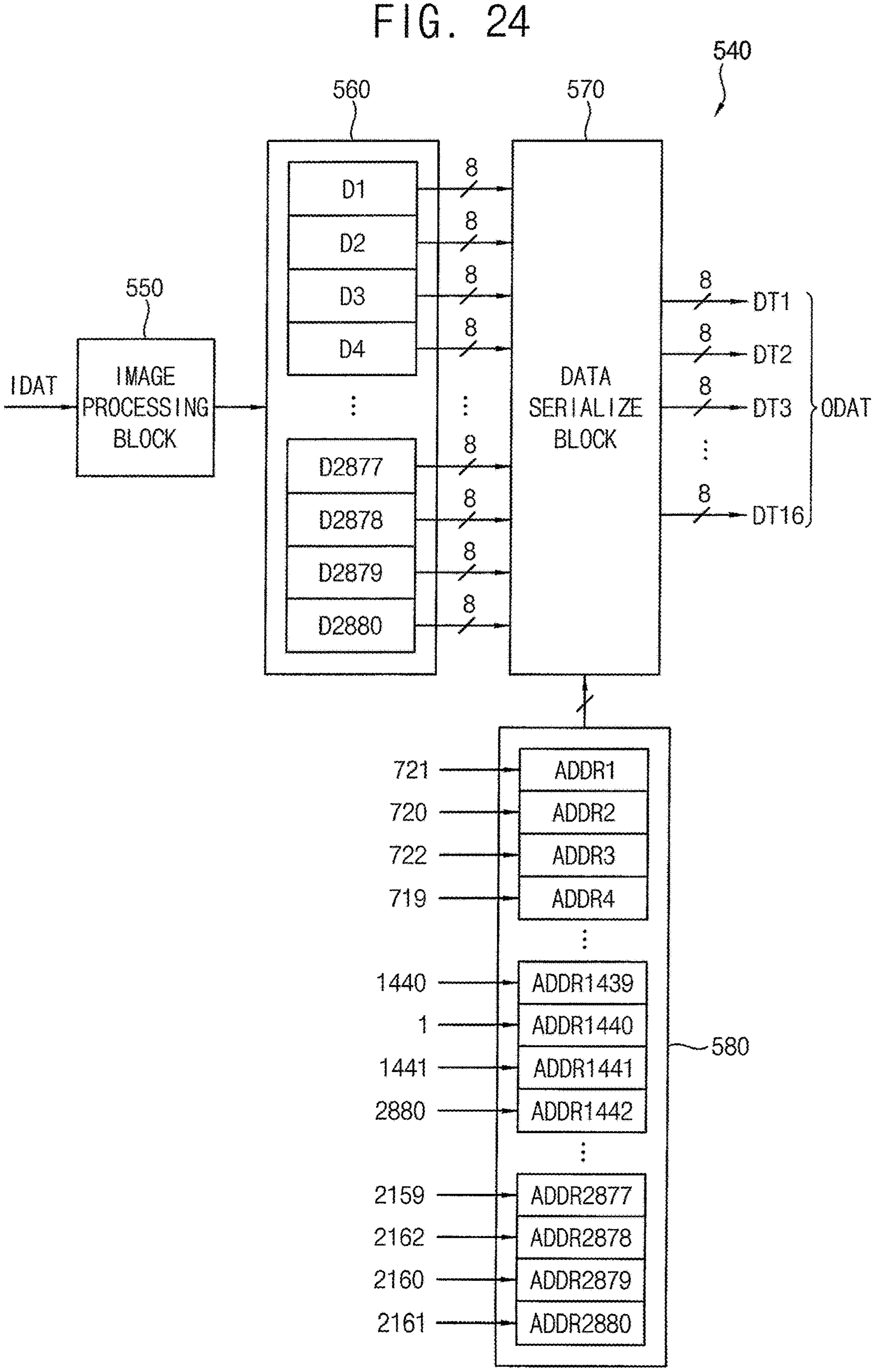
FIG. 24 is a block diagram illustrating an example of a controller included in a display device of FIG. 23.

FIG. 23 is a block diagram illustrating a display device including a data driver according to embodiments, and FIG. 24 is a block diagram illustrating an example of a controller included in a display device of FIG. 23.

Referring to FIG. 23, a display device 500 according to embodiments may include a display panel 510, a scan driver 520, a data driver 530 and a controller 540. Unlike a display device 400 of FIG. 21, the display device 500 of FIG. 23 may include the normal or conventional data driver 530, and the controller 540 may further include an address line memory 580.

The controller 540 may include an image processing block 550 that performs image processing on input image data IDAT, a data line memory 560 that stores the input image data IDAT for each pixel row of the display panel 510, an address line memory 580 that stores addresses for the input image data IDAT, and a data serialize block 570 that generates output image data ODAT provided to the data driver 530 by rearranging the input image data IDAT stored in the data line memory 560 based on the addresses stored in the address line memory 580.

As illustrated in FIG. 24, the input image data IDAT stored in the data line memory 560 may include first through (4N)-th pixel data for pixels PX of each pixel row, for example, 1st through 2880th pixel data D1 through D2880, where N is an integer greater than 0 (e.g., 720). The addresses stored in the address line memory 580 may include first through (4N)-th addresses, for example, 1st through 2880th addresses ADDR1 through ADDR2880. In some embodiments, in a case where the display panel 510 is a normal display panel, the address line memory 580 may store values of 1 through 2880 in the 1st through 2880th addresses ADDR1 through ADDR2880, respectively. The data serialize block 570 may sequentially selects the 1st through 2880th pixel data D1 through D2880 as the output image data ODAT in response to the 1st through 2880th addresses ADDR1 through ADDR2880 having the values of 1 through 2880, respectively, and may provide the sequentially selected 1st through 2880th pixel data D1 through D2880 to the data driver 530 through sixteen data transfer line sets DT1, DT2, DT3, . . . , DT16. Accordingly, the data driver 530 may output the data voltages VD in an order suitable for the normal display panel.

In other embodiments, in a case where the display panel 510 is a dead space reduced display panel, the address line memory 580 may store a value of (N+K) in a (2K−1)-th address of the first through (2N)-th addresses ADDR1 through ADDR1440, may store a value of (N−K+1) as a (2K)-th address of the first through (2N)-th addresses ADDR1 through ADDR1440, may store a value of (2N+K) as a (2N+2K−1)-th address of the (2N+1)-th through (4N)-th addresses ADDR1441 through ADDR2880, and may store a value of (4N−K+1) as a (2N+2K)-th address of the (2N+1)-th through (4N)-th addresses ADDR1441 through ADDR2880, where K is an integer greater than 0 and less than or equal to N. For example, as illustrated in FIG. 24, the address line memory 580 may store values of 721, 722, . . . , and 1440 as 1st, 3rd, . . . , and 1439th addresses ADDR1, ADDR3, . . . , ADDR1439, respectively, may store values of 720, 719, . . . , and 1 as 2nd, 4th, . . . , and 1440th addresses ADDR2, ADDR4, . . . , ADDR1440, may store values of 1441, . . . , 2159 and 2160 as 1441st, . . . , 2877th, and 2879th addresses ADDR1441, . . . , ADDR2877 and ADDR2879, respectively, and may store values of 2880, . . . , 2162 and 2161 as 1442nd, . . . , 2878th, and 2880th addresses ADDR1442, . . . , ADDR2878 and ADDR2880, respectively.

The data serialize block 570 may output (N+K)-th pixel data and (N−K+1)-th pixel data of the first through (2N)-th pixel data as the output image data ODAT in response to the first through (2N)-th addresses ADDR1 through ADDR1440 having the value of (N+K) and the value of (N−K+1), and may output (2N+K)-th pixel data and (4N−K+1)-th pixel data of the (2N+1)-th through (4N)-th pixel data as the output image data ODAT in response to the (2N+1)-th through (4N)-th addresses ADDR1441 through ADDR2880 having the value of (2N+K) and the value of (4N−K+1). In the example of FIG. 24, the output image data ODAT may include 1st through 2880th pixel data D1 through D2880 that are rearranged in an order of 721st pixel data, 720th pixel data, 722nd pixel data, 719th pixel data, . . . , 1440th pixel data, 1st pixel data D1, 1441st pixel data, 2880th pixel data D2880, . . . , 2159th pixel data, 2162nd pixel data, 2160th pixel data and 2161st pixel data, and may be provided to the data driver 530 in a manner such that sixteen pixel data may be substantially simultaneously provided. Accordingly, although the data driver 530 is the normal data driver other than a data driver 100 of FIG. 1 and a data driver 300 of FIG. 12, the controller 540 and the data driver 530 may be able to output the data voltages VD in an order suitable for the dead space reduced display panel.

As described above, the display device 500 according to embodiments may rearrange the pixel data D1 through D2880 stored in the data line memory 560 by using the address line memory 580, and may provide the rearranged pixel data D1 through D2880 to the data driver 530. Accordingly, the controller 540 and the data driver 530 may output the data voltages VD not only in the order suitable for the normal display panel, but also in the order suitable for the dead space reduced display panel.

Figure 25:
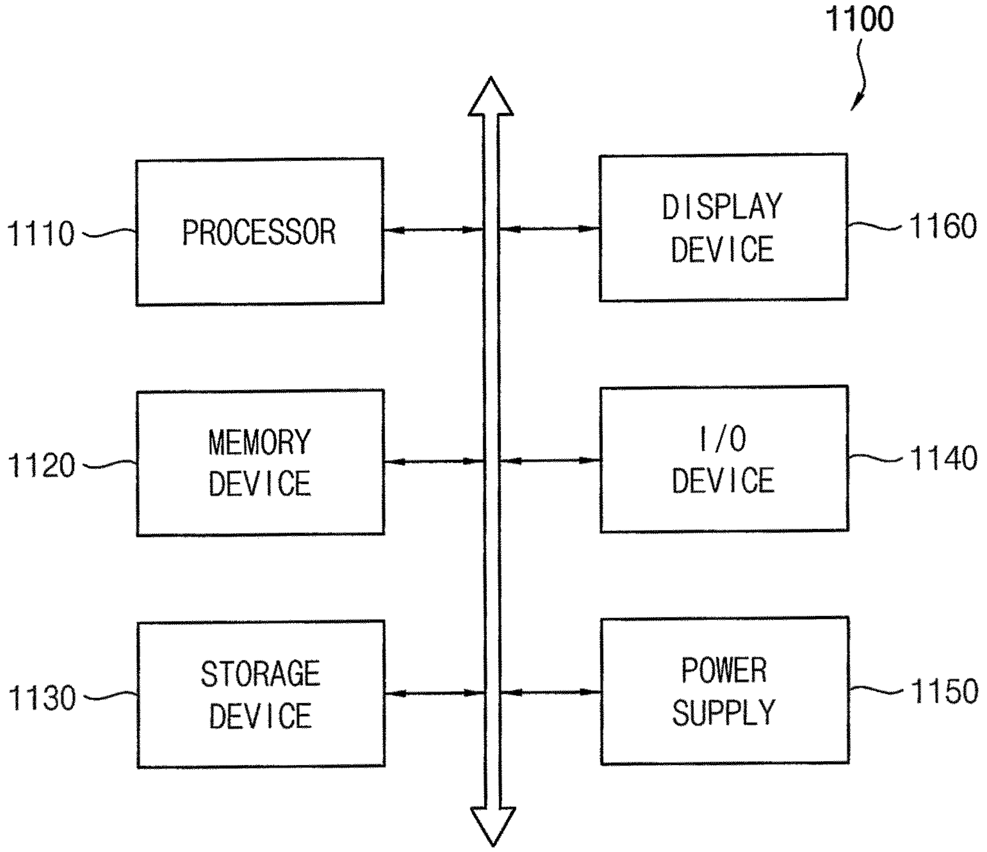
FIG. 25 is a block diagram illustrating an electronic device including a display device according to embodiments.

FIG. 25 is a block diagram illustrating an electronic device including a display device according to embodiments.

Referring to FIG. 25, an electronic device 1100 may include a processor 1110, a memory device 1120, a storage device 1130, an input/output ("I/O") device 1140, a power supply 1150, and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor (AP), a micro processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc, and/or at least one volatile memory device such as a dynamic random access memory ("DRAM") device, a static random access memory ("SRAM") device, a mobile dynamic random access memory (mobile DRAM) device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100.

In some embodiments, a shift register array block of the display device 1160 may include left odd, left even, right odd and right even shift register arrays. The left odd, left even, right odd and right even shift register arrays may change an order of generating sampling signals according to a structure of a display panel to which a data driver is connected, and thus an order of data voltages at output terminals of the data driver may be changed. In other embodiments, the display device 1160 may rearrange image data stored in a data line memory by using an address line memory, and may provide the rearranged image data to the data driver. Accordingly, the data driver of the display device 1160 may output the data voltage not only in an order suitable for a normal display panel, but also in an order suitable for a dead space reduced display panel.

According to embodiments, the electronic device 1100 may be any electronic device including the display device 1160, such as a digital television, a 3D television, a personal computer ("PC"), a home appliance, a laptop computer, a cellular phone, a smart phone, a tablet computer, a wearable device, a personal digital assistant ("PDA"), a portable multimedia player ("PMP"), a digital camera, a music player, a portable game console, a navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel;

a data driver which provides data voltages to the display panel; and a controller which provides output image data to the data driver, the controller including:

a data line memory which stores input image data for a pixel row of the display panel;

an address line memory which stores addresses for the input image data; and a data serialize block which generates the output image data provided to the data driver by rearranging the input image data stored in the data line memory based on the addresses stored in the address line memory, wherein in a case where the display panel is a dead space reduced display panel, the address line memory stores different values to the addresses, respectively, in a different order than in a case where the display panel is a normal display panel.

2. The display device of claim 1, wherein the input image data stored in the data line memory include first through (4N)-th pixel data for pixels of the pixel row, where N is an integer greater than 0, wherein the addresses stored in the address line memory include first through (4N)-th addresses, wherein, in the case where the display panel is the normal display panel, the address line memory stores the values of 1 through 4N as the first through (4N)-th addresses, respectively, and the data serialize block sequentially outputs the first through (4N)-th pixel data as the output image data in response to the addresses having the values of 1 through 4N, and wherein, in the case where the display panel is the dead space reduced display panel, the address line memory stores a value of (N+K) as a (2K-1)-th address of the first through (2N)-th addresses, stores a value of (N-K+1) as a (2K)-th address of the first through (2N)-th addresses, stores a value of (2N+K) as a (2N+2K-1)-th address of the (2N+1)-th through (4N)-th addresses, and stores a value of (4N-K+1) as a (2N+2K)-th address of the (2N+1)-th through (4N)-th addresses, where K is an integer greater than 0 and less than or equal to N, and the data serialize block outputs (N+K)-th pixel data and (N-K+1)-th pixel data of the first through (2N)-th pixel data as the output image data in response to the first through (2N)-th addresses having the value of (N+K) and the value of (N-K+1), and outputs (2N+K)-th pixel data and (4N-K+1)-th pixel data of the (2N+1)-th through (4N)-th pixel data as the output image data in response to the (2N+1)-th through (4N)-th addresses having the value of (2N+K) and the value of (4N-K+1).

3. A data driver for providing data voltages to a display panel, the data driver comprising:

a shift register array block which generates sampling signals in response to first, second, third and fourth start signals, first, second, third and fourth direction signals, and first and second clock signals;

a sampling latch array which samples output image data in response to the sampling signals;

a holding latch array which stores the output image data sampled by the sampling latch array in response to a load signal;

a digital-to-analog converter array which converts the output image data output from the holding latch array into the data voltages; and an output buffer array which outputs the data voltages at output terminals, wherein the shift register array block includes:

a first shift register array which generates a first portion of the sampling signals in response to the first start signal, the first direction signal and the first clock signal;

a second shift register array which generates a second portion of the sampling signals in response to the second start signal, the second direction signal and the second clock signal;

a third shift register array which generates a third portion of the sampling signals in response to the third start signal, the third direction signal and the first clock signal; and a fourth shift register array which generates a fourth portion of the sampling signals in response to the fourth start signal, the fourth direction signal and the second clock signal, wherein, in a case where the display panel is a normal display panel, the shift register array block generates the sampling signals in a first order, and wherein, in a case where the display panel is a dead space reduced display panel, the shift register arrat block generates the sampling signals in a second order different from the first order.

4. The data driver of claim 3, wherein the normal display panel includes data lines sequentially connected to the output terminals, and wherein the shift register array block sequentially generates the sampling signals in the case where the display panel is the normal display panel.

5. The data driver of claim 3, wherein a display region of the dead space reduced display panel is divided into a left region, a center region and a right region, wherein the dead space reduced display panel includes data lines, first auxiliary lines connected to the data lines located in the left region, and second auxiliary lines connected to the data lines located in the right region, wherein the data lines located in the center region are directly connected to odd output terminals of the output terminals, the data lines located in the left region are connected to left even output terminals of the output terminals through the first auxiliary lines, and the data lines located in the right region are connected to right even output terminals of the output terminals through the second auxiliary lines, wherein the sampling signals include odd sampling signals corresponding to the odd output terminals, left even sampling signals corresponding to the left even output terminals, and right even sampling signals corresponding to the right even output terminals in the case where the display panel is the dead space reduced display panel, and wherein the shift register array block generates the sampling signals in an order of the left even sampling signals, the odd sampling signals and the right even sampling signals in the case where the display panel is the dead space reduced display panel.

6. The data driver of claim 3, wherein a display region of the dead space reduced display panel is divided into a left region, a left center region, a right center region and a right region, wherein the dead space reduced display panel includes data lines, first auxiliary lines connected to the data lines located in the left region, and second auxiliary lines connected to the data lines located in the right region, wherein the data lines located in the left center region are directly connected to left odd output terminals of the output terminals, the data lines located in the right center region are directly connected to right even output terminals of the output terminals, the data lines located in the left region are connected to left even output terminals of the output terminals through the first auxiliary lines, and the data lines located in the right region are connected to right odd output terminals of the output terminals through the second auxiliary lines, wherein the sampling signals include left odd sampling signals corresponding to the left odd output terminals, left even sampling signals corresponding to the left even output terminals, right odd sampling signals corresponding to the right odd output terminals, and right even sampling signals corresponding to the right even output terminals in the case where the display panel is the dead space reduced display panel, and wherein the shift register array block generates the sampling signals in an order of the left even sampling signals, the left odd sampling signals, the right even sampling signals and the right odd sampling signals in the case where the display panel is the dead space reduced display panel.

7. The data driver of claim 3, wherein the first, second, third and fourth start signals are left odd, left even, right odd and right even start signals, respectively, wherein the first, second, third and fourth direction signals are left odd, left even, right odd and right even direction signals, respectively, wherein the first and second clock signals are odd and even clock signals, respectively, wherein the first shift register array is a left odd shift register array which generates left odd sampling signals as the first portion of the sampling signals in response to the left odd start signal, the left odd direction signal and the odd clock signal, wherein the second shift register array is a left even shift register array which generates left even sampling signals as the second portion of the sampling signals in response to the left even start signal, the left even direction signal and the even clock signal, wherein the third shift register array is a right odd shift register array which generates right odd sampling signals as the third portion of the sampling signals in response to the right odd start signal, the right odd direction signal and the odd clock signal, and wherein the fourth shift register array is a right even shift register array which generates right even sampling signals as the fourth portion of the sampling signals in response to the right even start signal, the right even direction signal and the even clock signal.

8. The data driver of claim 7, wherein the output terminals include first through (4N)-th output terminals, where N is an integer greater than 0, wherein the display panel includes first through (4N)-th data lines, wherein the first through (4N)-th data lines are sequentially connected to the first through (4N)-th output terminals, wherein the left odd and left even shift register arrays sequentially generate left sampling signals including the left odd sampling signals and the left even sampling signals, the left odd sampling signals being generated in response to the left odd direction signal indicating a forward direction and the odd clock signal, the left even sampling signals being generated in response to the left even direction signal indicating the forward direction and the even clock signal, and the odd and even clock signals having rising edges at different time points, and wherein the right odd and right even shift register arrays sequentially generate right sampling signals including the right odd sampling signals and the right even sampling signals, the right odd sampling signals being generated in response to the right odd direction signal indicating the forward direction and the odd clock signal, the right even sampling signals being generated in response to the right even direction signal indicating the forward direction and the even clock signal.

9. The data driver of claim 7, wherein the output terminals include first through (4N)-th output terminals, where N is an integer greater than 0, wherein the display panel includes first through (4N)-th data lines, firth through (N)-th auxiliary lines connected to the firth through (N)-th data lines, and (3N+1)-th through (4N)-th auxiliary lines connected to the (3N+1)-th through (4N)-th data lines, wherein a (K)-th data line of the first through (N)-th data lines is connected to a (2N-2K+2)-th output terminal through a (K)-th auxiliary line of the firth through (N)-th auxiliary lines, where K is an integer greater than 0 and less than or equal to N, wherein a (N+K)-th data line of the (N+1)-th through (2N)-th data lines is directly connected to a (2K-1)-th output terminal, and a (2N+K)-th data line of the (2N+1)-th through (3N)-th data lines is directly connected to a (2N+2K-1)-th output terminal, wherein a (3N+K)-th data line of the (3N+1)-th through (4N)-th data lines is connected to a (4N-2K+2)-th output terminal through a (3N+K)-th auxiliary line of the (3N+1)-th through (4N)-th auxiliary lines, wherein the data voltages include first through (4N)-th data voltages for the first through (4N)-th data lines, respectively, wherein the output buffer array outputs a (K)-th data voltage of the first through (N)-th data voltages at the (2N-2K+2)-th output terminal, outputs a (N+K)-th data voltage of the (N+1)-th through (2N)-th data voltages at the (2K-1)-th output terminal, outputs a (2N+K)-th data voltage of the (2N+1)-th through (3N)-th data voltages at the (2N+2K-1)-th output terminal, and outputs a (3N+K)-th data voltage of the (3N+1)-th through (4N)-th data voltages at the (4N-2K+2)-th output terminal.

10. The data driver of claim 9, wherein the left even shift register array generates the left even sampling signals corresponding to the (2N-2K+2)-th output terminal in a reverse order in response to the left even direction signal indicating a reverse direction such that the sampling latch array samples the output image data corresponding to the first through (N)-th data voltages, wherein the left odd shift register array generates the left odd sampling signals corresponding to the (2K-1)-th output terminal in a forward order in response to the left odd direction signal indicating a forward direction such that the sampling latch array samples the output image data corresponding to the (N+1)-th through (2N)-th data voltages, wherein the right odd shift register array generates the right odd sampling signals corresponding to the (2N+2K-1)-th output terminal in the forward order in response to the right odd direction signal indicating the forward direction such that the sampling latch array samples the output image data corresponding to the (2N+1)-th through (3N)-th data voltages, and wherein the right even shift register array generates the right even sampling signals corresponding to the (4N-2K+2)-th output terminal in the reverse order in response to the right even direction signal indicating the reverse direction such that the sampling latch array samples the output image data corresponding to the (3N+1)-th through (4N)-th data voltages.

11. The data driver of claim 7, wherein the output terminals include first through (4N)-th output terminals, where N is an integer greater than 0, wherein the display panel includes first through (4N)-th data lines, firth through (N)-th auxiliary lines connected to the firth through (N)-th data lines, and (3N+1)-th through (4N)-th auxiliary lines connected to the (3N+1)-th through (4N)-th data lines, wherein a (K)-th data line of the first through (N)-th data lines is connected to a (2N-2K+2)-th output terminal through a (K)-th auxiliary line of the firth through (N)-th auxiliary lines, where K is an integer greater than 0 and less than or equal to N, wherein a (N+K)-th data line of the (N+1)-th through (2N)-th data lines is directly connected to a (2K-1)-th output terminal, and a (2N+K)-th data line of the (2N+1)-th through (3N)-th data lines is directly connected to a (2N+2K)-th output terminal, wherein a (3N+K)-th data line of the (3N+1)-th through (4N)-th data lines is connected to a (4N-2K+1)-th output terminal through a (3N+K)-th auxiliary line of the (3N+1)-th through (4N)-th auxiliary lines, wherein the data voltages include first through (4N)-th data voltages for the first through (4N)-th data lines, wherein the output buffer array outputs a (K)-th data voltage of the first through (N)-th data voltages at the (2N-2K+2)-th output terminal, outputs a (N+K)-th data voltage of the (N+1)-th through (2N)-th data voltages at the (2K-1)-th output terminal, outputs a (2N+K)-th data voltage of the (2N+1)-th through (3N)-th data voltages at the (2N+2K)-th output terminal, and outputs a (3N+K)-th data voltage of the (3N+1)-th through (4N)-th data voltages at the (4N-2K+1)-th output terminal.

12. The data driver of claim 11, wherein the left even shift register array generates the left even sampling signals corresponding to the (2N-2K+2)-th output terminal in a reverse order in response to the left even direction signal indicating a reverse direction such that the sampling latch array samples the output image data corresponding to the first through (N)-th data voltages, wherein the left odd shift register array generates the left odd sampling signals corresponding to the (2K-1)-th output terminal in a forward order in response to the left odd direction signal indicating a forward direction such that the sampling latch array samples the output image data corresponding to the (N+1)-th through (2N)-th data voltages, wherein the right even shift register array generates the right even sampling signals corresponding to the (2N+2K)-th output terminal in the forward order in response to the right even direction signal indicating the forward direction such that the sampling latch array samples the output image data corresponding to the (2N+1)-th through (3N)-th data voltages, and wherein the right odd shift register array generates the right odd sampling signals corresponding to the (4N-2K+1)-th output terminal in the reverse order in response to the right odd direction signal indicating the reverse direction such that the sampling latch array samples the output image data corresponding to the (3N+1)-th through (4N)-th data voltages.

13. The data driver of claim 7, wherein the left odd shift register array receives a left odd middle start signal, wherein the left even shift register array receives a left even middle start signal, wherein the right odd shift register array receives a right odd middle start signal, and wherein the right even shift register array receives a right even middle start signal.

14. The data driver of claim 13, wherein the display panel is a normal display panel, wherein the normal display panel includes data lines, and the number of the data lines is less than the number of the output terminals, wherein outer output terminals of the output terminals are not connected to the data lines, and center output terminals of the output terminals are sequentially connected to the data lines, respectively, and wherein, to output the data voltages at the center output terminals, the left odd and left even shift register arrays sequentially generate a portion of left sampling signals including the left odd sampling signals and the left even sampling signals, the left odd sampling signals being generated in response to the left odd middle start signal, and the left even sampling signals being generated in response to the left even middle start signal, and the right odd and right even shift register arrays sequentially generate right sampling signals including the right odd sampling signals and the right even sampling signals, the right odd sampling signals being generated in response to the right odd start signal, and the right even sampling signals being generated in response to the right even start signal.

15. The data driver of claim 13, wherein the display panel is a dead space reduced display panel, wherein the dead space reduced display panel includes data lines and auxiliary lines, and the number of the data lines is less than the number of the output terminals, wherein outer output terminals of the output terminals are not connected to the data lines, and center output terminals of the output terminals are connected to the data lines or the auxiliary lines, and wherein, to output the data voltages at the center output terminals, the left even shift register array generates the left even sampling signals in a reverse order in response to the left even start signal, the left odd shift register array generates a portion of the left odd sampling signals in a forward order in response to the left odd middle start signal, the right odd shift register array generates the right odd sampling signals in the forward order in response to the right odd start signal, and the right even shift register array generates a portion of the right even sampling signals in the reverse order in response to the right even middle start signal.

16. The data driver of claim 13, wherein the display panel is a normal display panel, wherein the normal display panel includes data lines, and the number of the data lines is less than the number of the output terminals, wherein center output terminals of the output terminals are not connected to the data lines, and outer output terminals of the output terminals are sequentially connected to the data lines, and wherein, to output the data voltages at the outer output terminals, the left odd and left even shift register arrays sequentially generate left sampling signals including the left odd sampling signals and the left even sampling signals in response to the left odd start signal and the left even start signal, and the right odd and right even shift register arrays sequentially generate a portion of right sampling signals including the right odd sampling signals and the right even sampling signals in response to the right odd middle start signal and the right even middle start signal.

17. The data driver of claim 13, wherein the display panel is a dead space reduced display panel, wherein the dead space reduced display panel includes data lines and auxiliary lines, and the number of the data lines is less than the number of the output terminals, wherein center output terminals of the output terminals are not connected to the data lines, and outer output terminals of the output terminals are connected to the data lines or the auxiliary lines, and wherein, to output the data voltages at the outer output terminals, the left even shift register array generates a portion of the left even sampling signals in a reverse order in response to the left even middle start signal, the left odd shift register array generates the left odd sampling signals in a forward order in response to the left odd start signal, the right odd shift register array generates a portion of the right odd sampling signals in the forward order in response to the right odd middle start signal, and the right even shift register array generates the right even sampling signals in the reverse order in response to the right even start signal.

18. A display device comprising:

a display panel;

a data driver providing data voltages to the display panel; and a controller which provides output image data to the data driver, wherein the data driver includes:

a shift register array block which generates sampling signals in response to first, second, third and fourth start signals, first, second, third and fourth direction signals and first and second clock signals;

a sampling latch array which samples output image data in response to the sampling signals;

a holding latch array which stores the output image data sampled by the sampling latch array in response to a load signal;

a digital-to-analog converter array which converts the output image data output from the holding latch array into the data voltages; and an output buffer array which outputs the data voltages at output terminals, wherein the shift register array block includes:

a first shift register array which generates a first portion of the sampling signals in response to the first start signal, the first direction signal and the first clock signal;

a second shift register array which generates a second portion of the sampling signals in response to the second start signal, the second direction signal and the second clock signal;

a third shift register array which generates a third portion of the sampling signals in response to the third start signal, the third direction signal and the first clock signal; and a fourth shift register array which generates a fourth portion of the sampling signals in response to the fourth start signal, the fourth direction signal and the second clock signal, wherein the first, second, third and fourth start signals are left odd, left even, right odd and right even start signals, respectively, wherein the first, second, third and fourth direction signals are left odd, left even, right odd and right even direction signals, respctively, wherein the first and second clock signals are odd and even clock signals, respectively, wherein the first shift register array is a left odd shift register array which generates left odd sampling signals as the first portion of the sampling signals in response to the left odd start signal, the left odd direction signal and the odd clock signal, wherein the second shift register array is a left even shift register array which generates left even sampling signals as the second portion of the sampling signals in response to the left even start signal, the left even direction signal and the even clock signal, wherein the third shift register array is a right odd shift register array which generates right odd sampling signals as the third portion of the sampling signals in response to the right odd start signal, the right odd direction signal and the odd clock signal, and wherein the fourth shift register array is a right even shift register array which generates right even sampling signals as the fourth portion of the sampling signals in response to the right even start signal, the right even direction signal and the even clock signal.

19. The display device of claim 18, wherein the controller includes:

a data line memory which stores input image data for one pixel row of the display panel; and a data serialize block which generates the output image data provided to the data driver by rearranging the input image data stored in the data line memory.

* * * * *